United States Patent
Forster

(10) Patent No.: US 8,138,892 B2
(45) Date of Patent: Mar. 20, 2012

(54) VARIABLE FREQUENCY TAG

(75) Inventor: Ian James Forster, Chelmsford (GB)

(73) Assignee: Mineral Lassen LLC, Las Vegas, NV (US)

( * ) Notice: Subject to any disclaimer, the term of this patent is extended or adjusted under 35 U.S.C. 154(b) by 1593 days.

(21) Appl. No.: 10/520,174

(22) PCT Filed: Jul. 2, 2003

(86) PCT No.: PCT/GB03/02825
§ 371 (c)(1), (2), (4) Date: Aug. 25, 2006

(87) PCT Pub. No.: WO2004/006164
PCT Pub. Date: Jan. 15, 2004

(65) Prior Publication Data
US 2009/0219137 A1    Sep. 3, 2009

(30) Foreign Application Priority Data

Jul. 3, 2002  (GB) .................................. 0215317.9

(51) Int. Cl.
| H04Q 5/22 | (2006.01) |
| B60Q 1/00 | (2006.01) |
| H04B 5/00 | (2006.01) |
| H04B 1/00 | (2006.01) |
| H04B 1/38 | (2006.01) |

(52) U.S. Cl. ..................... 340/10.4; 340/10.3; 340/10.2; 340/10.1; 340/435; 455/41.1; 455/90.1; 455/42

(58) Field of Classification Search ............... 340/10.31, 340/435
See application file for complete search history.

(56) References Cited

U.S. PATENT DOCUMENTS

| 3,798,642 A | 3/1974 | Augenblick |
| 4,623,890 A | 11/1986 | Nysen |
| 4,680,582 A * | 7/1987 | Mejia .......................... 340/3.21 |

(Continued)

FOREIGN PATENT DOCUMENTS

WO    0150407 A1    7/2001

(Continued)

OTHER PUBLICATIONS

International Search Report mailed Oct. 9, 2003, issued in corresponding International Application No. PCT/GB03/02825, filed Jul. 2, 2003.

*Primary Examiner* — Daniel Wu
*Assistant Examiner* — Pameshanand Mahase
(74) *Attorney, Agent, or Firm* — Christensen O'Connor Johnson Kindness PLLC

(57) ABSTRACT

An antenna assembly is operative for receiving interrogating radiation at a variable frequency tag and generating a corresponding received signal, and for receiving a signature signal and radiating corresponding response radiation. A logic unit is operative for receiving the received signal and outputting the signature signal in response, the signature signal including a signature code for use in identifying the tag. A voltage controlled oscillator is operative for controlling a rate at which the signature code is output; and a power supply is operative for providing an electrical potential difference for energizing the tag. The voltage controlled oscillator is operable to output the signature code at a rate which is governed by the magnitude of the received signal.

38 Claims, 12 Drawing Sheets

U.S. PATENT DOCUMENTS

| | | | |
|---|---|---|---|
| 4,839,642 A | 6/1989 | Batz | |
| 5,302,954 A | 4/1994 | Brooks | |
| 5,369,800 A * | 11/1994 | Takagi et al. | 455/59 |
| 6,154,137 A * | 11/2000 | Goff et al. | 340/572.4 |
| 6,346,878 B1 * | 2/2002 | Pohlman et al. | 340/435 |
| 6,441,723 B1 * | 8/2002 | Mansfield et al. | 340/538.11 |
| 6,700,931 B1 * | 3/2004 | Lee et al. | 375/239 |
| 6,745,008 B1 * | 6/2004 | Carrender et al. | 455/41.1 |
| 6,838,989 B1 * | 1/2005 | Mays et al. | 340/572.1 |
| 2002/0149484 A1 * | 10/2002 | Carrender | 340/572.4 |
| 2003/0095033 A1 * | 5/2003 | Amtmann | 340/10.1 |
| 2003/0121985 A1 * | 7/2003 | Baldischweiler et al. | 235/492 |

FOREIGN PATENT DOCUMENTS

| | | |
|---|---|---|
| WO | 0157790 A2 | 8/2001 |
| WO | 0195243 A2 | 12/2001 |
| WO | 03042913 A1 | 5/2003 |

* cited by examiner

VARIABLE FREQUENCY TAG

The present invention relates to a variable frequency tag. Moreover, the invention relates to a method of interrogating one or more tags according to the invention. Furthermore, the invention also relates to a tagging system incorporating one or more tags according to the invention and operating according to the aforementioned method.

Tags capable of receiving interrogating radiation and emitting corresponding response radiation are known. Such tags are often a few mm's to cm's in size and designed to be affixed to products or to be personnel wearable. Moreover, such tags often include active electronic circuits, for example one or more of amplifiers, microprocessors and simple logic circuits. These electronic circuits require a supply potential difference to operate. The supply potential can be provided from power sources incorporated into the tags, for example from one or more button cells. Alternatively, the potential can be generated from radiation received at the tags.

Generating the supply potential from received radiation results in the tags exhibiting a relatively limited operating range from associated tag interrogating devices, usually in the order of a few metres distance. There are often limits imposed to radiation electric field strengths that can be emitted from such interrogating devices, especially when the devices operate at microwave frequencies in environments where personnel can potentially be subjected to the radiation. Microwave radiation in this context is defined as electromagnetic radiation having a frequency in a range of 500 MHz to 90 GHz.

The inventor has appreciated that there are considerable benefits from employing tags which are not dependent on power sources local thereto. Tag operating lifetime can thereby be extended, tag construction can be simplified and further miniaturised, and tag manufacturing cost can be reduced. Such benefits are important where tags are employed to label a multitude of low cost products which are to be stored for long periods of time, for example to mature, and then at the end of the period individually identified by remotely interrogating the tags.

The inventor has also appreciated that interrogating devices for interrogating tags must be capable of coping with multiple tag contention where several of the tags respond simultaneously to interrogation. Conventional storage areas can accommodate many thousands of individual products hence contention problems can be potentially complex if such products are labeled with tags.

Thus, the inventor has appreciated that there is at least one problem associated with conventional tags, namely:

(a) contention problems when a plurality of tags are simultaneously interrogated;

(b) limited operating range problems when the tags are powered by radiation received thereat; and (c) limited tag lifetime when the tags are powered by power sources local thereto.

In order to address one or more of the aforesaid problems, the inventor has devised a new type of tag according to the invention.

According to a first aspect of the present invention, there is provided a variable frequency tag comprising:

(a) interfacing means for receiving interrogating radiation at the tag and generating a corresponding received signal, and for receiving a signature signal and radiating corresponding response radiation;

(b) processing means for receiving the received signal and outputting the signature signal in response, the signature signal including a signature code for use in identifying the tag;

(c) clocking means for controlling a rate at which the signature code is output; and (d) power supplying means for providing an electrical potential difference for energizing the tag, characterised in that the clocking means is operable to output the signature code at a rate which is governed by the magnitude of the received signal.

The tag provides the advantage that it is capable of addressing one or more of the aforementioned problems, namely:

(a) resolving contention problems when a plurality of tags are simultaneously interrogated;

(b) extending operating range when the tags are powered by radiation received thereat; and (c) extending tag lifetime when the tags are powered by power sources local thereto.

The rate at which the signature code is output is defined to be one or more of the following:

(a) the frequency at which the signature code itself is repetitively output; and (b) the rate at which data bits comprising the signature code are output each time the signature code is output.

Signature code is to be construed as any type of code, either analogue of digital or both, by which the tag can be identified.

Preferably, in order to circumvent a need for the tag to include its own local power source or use its local power supply to a lesser extent, the supplying means is coupled to the interfacing means, the supplying means being operable to derive the potential difference from the received signal. Thus, the tag can be powered by or its operation determined by radiation received thereat.

Received signals can often be of insufficient voltage amplitude to be rectified to operate electronic circuits. Thus, preferably, the supplying means includes a transformer for enhancing the potential difference applied to the clocking means and the processing means. It is especially preferable that the transformer is a piezo-electric transformer because such a transformer can be made compact and can provide a suitable impedance at its connection ports for operating the tag.

In order to obtain a beneficial voltage amplitude increase to operate semiconductor devices in the tag, the transformer preferably includes a multilayer primary region arranged to be driven by the received signal, and a single-layer secondary region at which the potential difference is generated, the primary and secondary regions being mechanically coupled.

The inventor has appreciated that the tag can be potentially damaged by excess supply voltage when operated with relatively strong radiation received thereat. To address such potential damage, the supplying means preferably includes potential difference limiting means for preventing excess supply potential damage to the processing means and the clocking means.

In practice, it is would especially desirable to use radio radiation to interrogate the tag. Thus, conveniently, the interfacing means comprises an antenna assembly operable to generate the response radiation from the received radiation by modulating reflectivity of the antenna assembly depending upon tag power consumption. For example, the antenna assembly can beneficially comprise a folded dipole antenna.

In order to assist with resolving contention and also to extend tag operating range, it is especially preferable that the clocking means is operable to clock the processing means at a rate which increases as the potential difference increases. In many types of electronic circuit, for example complementary metal-oxide-semiconductor (CMOS) circuits, power consumption increases with clocking rate. Thus, by reducing the clocking rate for relatively lower potential differences, tag power consumption is reduced which is beneficial when the received signal is relatively weak at greater operating distances.

In some tag interrogation systems, it is desirable that standardised frequencies are employed. To conform to such standardised frequencies, it is preferable that the clocking means is operable to increase the rate at which the processing means is clocked in a stepwise manner in response to increase in the potential difference. More preferably, the clocking means comprises digital dividing means for dividing a master clock signal to generate a clocking signal for clocking the processing means, the master clock signal being derived from the received signal; employing the received radiation to define the master clock signal provides the benefit that tag operating frequency can be synchronously linked to interrogating devices interrogating the tag.

Alternatively, the clocking means preferably comprises digital dividing means for dividing a master clock signal generated by oscillating means, the master clock signal being substantially constant in operation.

In one embodiment of the invention, it is desirable that the clocking means is operable to increase the rate at which the processing means is clocked in a substantially linear manner in response to increase in the potential difference. Alternatively, especially where greater tag operating distances are anticipated, it is preferable that the clocking means is operable to increase the rate at which the processing means is clocking in a substantially logarithmic manner in response to increase in the potential difference.

Low cost is an important attribute of the tag. The inventor has appreciated that the clocking means can be implemented in a simple inexpensive manner by connecting a plurality of serially connected logic gates together with feedback therearound for generating a clocking signal for clocking the processing means, the logic gates having a signal propagation therethrough which is a function of the potential difference, thereby rendering the clocking signal frequency dependent on the potential difference. It is found especially preferable for the oscillator to comprise a ring-of-three logic gates configured with feedback therearound for generating the clocking signal.

When designing the tag, the inventor has found is preferable for the processing means to account for a majority of power required to operate the tag; such power consumption is determined by the clocking rate and can be used to provide the tag with its extended range. More preferably, the processing means includes CMOS logic circuits for generating the signature code, the logic circuits operable to consume increasing power in operation as their clocking rate is increased.

Contention arises when a plurality of the tags respond simultaneously. In order to give each tag an opportunity to provide an uninterrupted response, the processing means is preferably operable to output the signature code repetitively with pause intervals therebetween during which the code is not output.

The inventor has appreciated that there are other ways also of resolving contention. Preferably, therefore, the processing means is receptive to one or more synchronisation pulses in the received signal and is switchable to a temporary wait state in which the processing means does not output its signature code when the one or more synchronisation pulses do not align to a synchronisation time window after the tag outputs its signature code. Use of such pulses and associated time window enables competing tags to be temporarily disabled for allowing individually uninterrupted responses from each of the tags to be received.

In a second aspect of the present invention, there is provided an interrogating device for interrogating one or more tags according to the first aspect of the invention, the device characterised in that it incorporates:

(a) signal generating means for generating an interrogating signal;

(b) interrogation interfacing means for radiating the interrogating signal as interrogating radiation towards said one or more tags, and for receiving response radiation from said one or more tags and generating a corresponding response signal; and (c) signal processing means for filtering the response signal and thereby isolating signal spectral components from each of said one or more tags and extracting signature codes from the signal components for identifying said one or more tags.

On account of the variable frequency nature of the tag according to the first aspect of the invention, the device exploits such nature to resolve contention between a plurality of tags responding simultaneously.

When one or more tags are operated such that their clocking frequency is determined by the amplitude of received signals, the rates at which the signature codes are output are a function of the received signal amplitudes and hence tag distances from the interrogating device. Thus, by moving a plurality of the tags spatially with respect to the device, a variety of clocking rates for each tag can be received by the device and used to resolve multiple tag contention. Thus, preferably, the device includes tag transporting means for transporting in operation said one or more tags spatially in relation to the interrogation interfacing means, the signal processing means being operable to sample the response signal repetitively at intervals for resolving multiple tag contention.

As an alternative to spatially moving said one or more tags, the device itself can be spatially repositioned. Such repositioning can be conveniently achieved by arranging for the interrogation interfacing means to comprise a plurality of antennae spatially disposed in relation to said one or more tags for radiating the interrogating radiation, the signal processing means operable to switch in sequence through the antennae to interrogate said one or more tags from varying distances, and to process corresponding response signals at the device for resolving multiple tag contention.

In a third aspect of the present invention, there is provided a tagging system incorporating one or more tags according to the first aspect of the invention and an interrogating device according to the second aspect of the invention for interrogating and identifying said one or more tags.

In a fourth aspect of the present invention, there is provided a method of interrogating a variable frequency tag using an interrogating device, the method characterised in that it includes the steps of:

(a) emitting interrogating radiation from the device towards the tag;

(b) receiving the interrogating radiation at the tag and generating a corresponding received signal;

(c) receiving the received signal at processing means of the tag;

(d) outputting a signature signal from the processing means in response to receiving the received signal thereat, the signature signal including a signature code for use in identifying the tag, the signature code being output at a rate dependent upon a supply potential difference energizing the tag;

(e) radiating the signature signal as response radiation from the tag;

(f) receiving the response radiation from the tag at the device and generating a corresponding interrogation received signal thereat;

(g) filtering the interrogation received signal in the device to isolate one or more spectral components corresponding to the tag, extracting the signature code of the tag from said one or more spectral components and then correlating said signature code with one or more signature templates to identify the tag.

Preferably in the method, the supply potential difference is derived from the received signal to circumvent a need to include a local power source in the tag. More preferably, the supply potential difference is enhanced by using a piezo-electric step-up transformer to provide the tag with greater operating range.

In a fifth aspect of the present invention, there is provided a method of resolving contention between a plurality of variable frequency tags interrogated from an interrogating device, the method characterised in that it includes the steps of:

(a) emitting interrogating radiation from the device towards the tags;

(b) receiving the interrogating radiation at each tag and generating a corresponding received signal thereat;

(c) receiving at each tag the received signal at processing means of the tag;

(d) outputting a signature signal from the processing means of each tag in response to receiving the received signal thereat, the signature signal including an associated signature code for use in identifying the tag, the signature code being output at a rate dependent upon a supply potential difference energizing the tag, the potential difference being derived from the received signal of the tag;

(e) radiating the signature signal of each tag as response radiation from the tag;

(f) receiving the response radiation from the tags at the device and generating a corresponding interrogation received signal thereat;

(g) filtering the interrogation received signal at the device to isolate one or more spectral components corresponding to the tags, extracting the signature codes of the tags from said one or more spectral components and then correlating said signature codes with one or more signature templates for identifying the tags; and (h) if contention exists with respect to one or more of the components, repetitively modifying a spatial relationship between the device and the tags and repeating steps (a) to (g) until the contention is resolved.

In a sixth aspect of the present invention, there is provided a method of resolving contention between a plurality of variable frequency tags interrogated from an interrogating device, the method characterised in that it includes the steps of:

(a) emitting interrogating radiation from the device towards the tags;

(b) receiving the interrogating radiation at each tag and generating a corresponding received signal thereat;

(c) receiving at each tag the received signal at processing means of the tag;

(d) outputting a signature signal from the processing means of each tag in response to receiving the received signal thereat, the signature signal including an associated signature code for use in identifying the tag, the signature code being output at a rate dependent upon a supply potential difference energizing the tag, the potential difference being derived from the received signal of the tag, the signature code being repetitively output with pauses therebetween during which the code is not output;

(e) radiating the signature signal of each tag as response radiation from the tag;

(f) receiving the response radiation from the tags at the device and generating a corresponding interrogation received signal thereat;

(g) filtering the interrogation received signal at the device to isolate one or more spectral components corresponding to the tags, extracting the signature codes of the tags from said one or more spectral components and then correlating said signature codes with one or more signature templates for identifying the tags; and (h) if contention exists with respect to one or more of the components, repeating steps (a) to (g) until the contention is resolved.

In a seventh aspect of the present invention, there is provided a method of resolving contention between a plurality of variable frequency tags interrogated from an interrogating device, the method characterised in that it includes the steps of:

(a) emitting interrogating radiation from the device towards the tags;

(b) receiving the interrogating radiation at each tag and generating a corresponding received signal thereat;

(c) receiving at each tag the received signal at processing means of the tag;

(d) identifying one or more pulses present in the received signal at each tag, outputting an associated signature signal from the processing means of the tag in response to receiving the received signal thereat depending on whether or not said one or more pulses are coincident with a time window associated with the tag, the signature signal including an associated signature code for use in identifying the tag, the signature code output at a rate dependent upon a supply potential difference energizing the tag, the potential difference being derived from the received signal of the tag;

(e) radiating the signature signals as response radiation from one or more of the tags;

(f) receiving the response radiation from said one or more of the tags at the device and generating a corresponding interrogation received signal thereat;

(g) filtering the interrogation received signal at the device to isolate one or more spectral components corresponding to said one or more of the tags, extracting the signature codes of said one or more of the tags from said one or more spectral components and then correlating said signature codes with one or more signature templates for identifying said one or more of the tags; and (h) if contention exists with respect to one or more of the components, outputting said one or more pulses in the interrogating radiation to temporarily disable one or more of the tags from responding and repeating steps (a) to (g) until the contention is resolved.

Preferably, the time window of each tag is temporally dependent upon a clocking rate at which the processing means of the tag is clocked, the clocking rate in turn being dependent upon the supply potential difference of the tag. The method provides the advantage that the interrogating device can control one or more of the tags individually.

Embodiments of the invention will now be described, by way of example only, with reference to the following diagrams in which.

Figure 2:
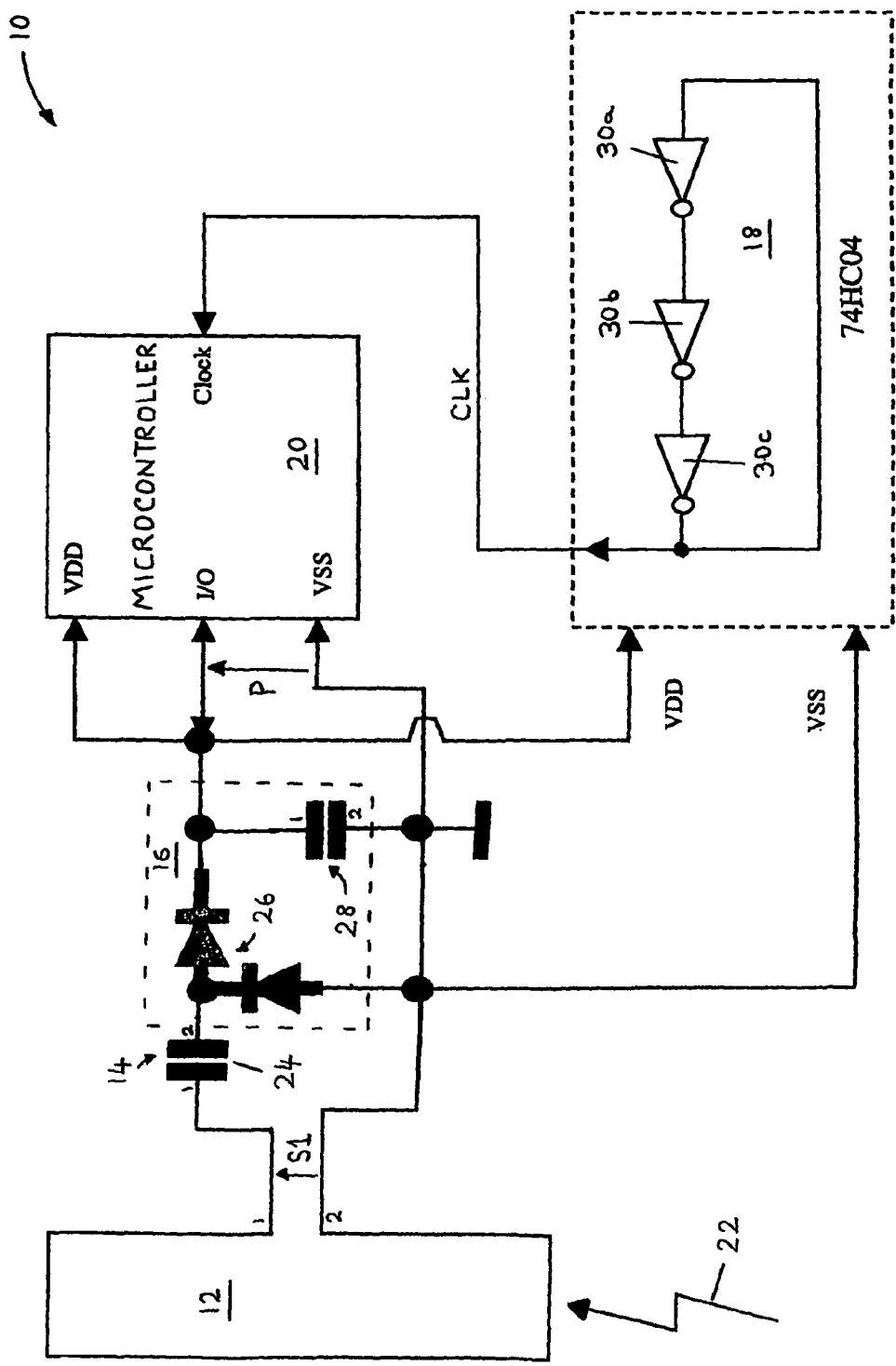
FIG. 2 is a circuit diagram illustrating a first practical implementation of the tag shown in FIG. 1 employing direct power supply potential loading.
Figure 10:
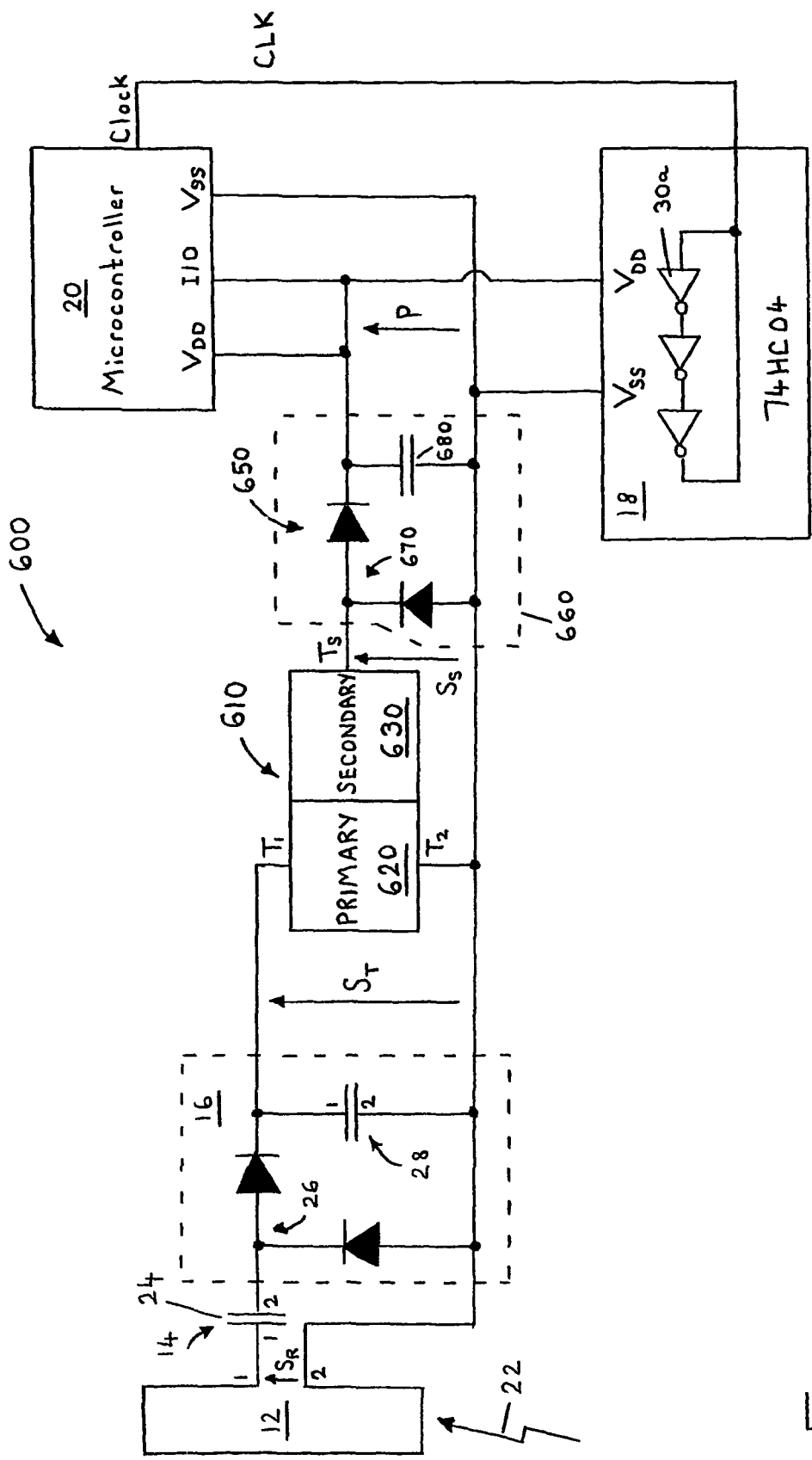
FIG. 10 is a circuit diagram of a modified version of the tag illustrated in FIG. 2 including a piezo-electric transformer for providing the tag with extended operating range when powered by radiation received thereat.
Figure 11:
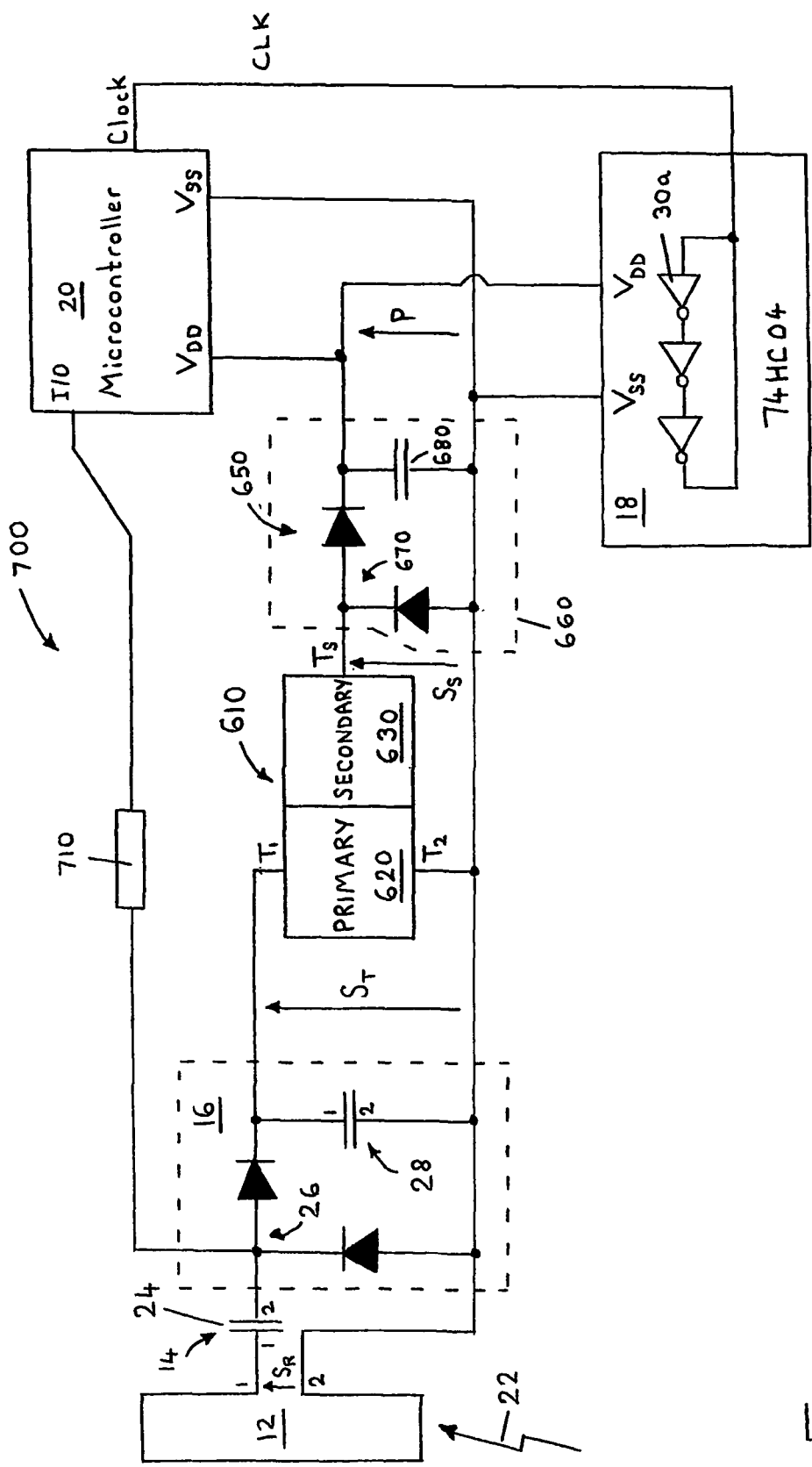
Figure 12:
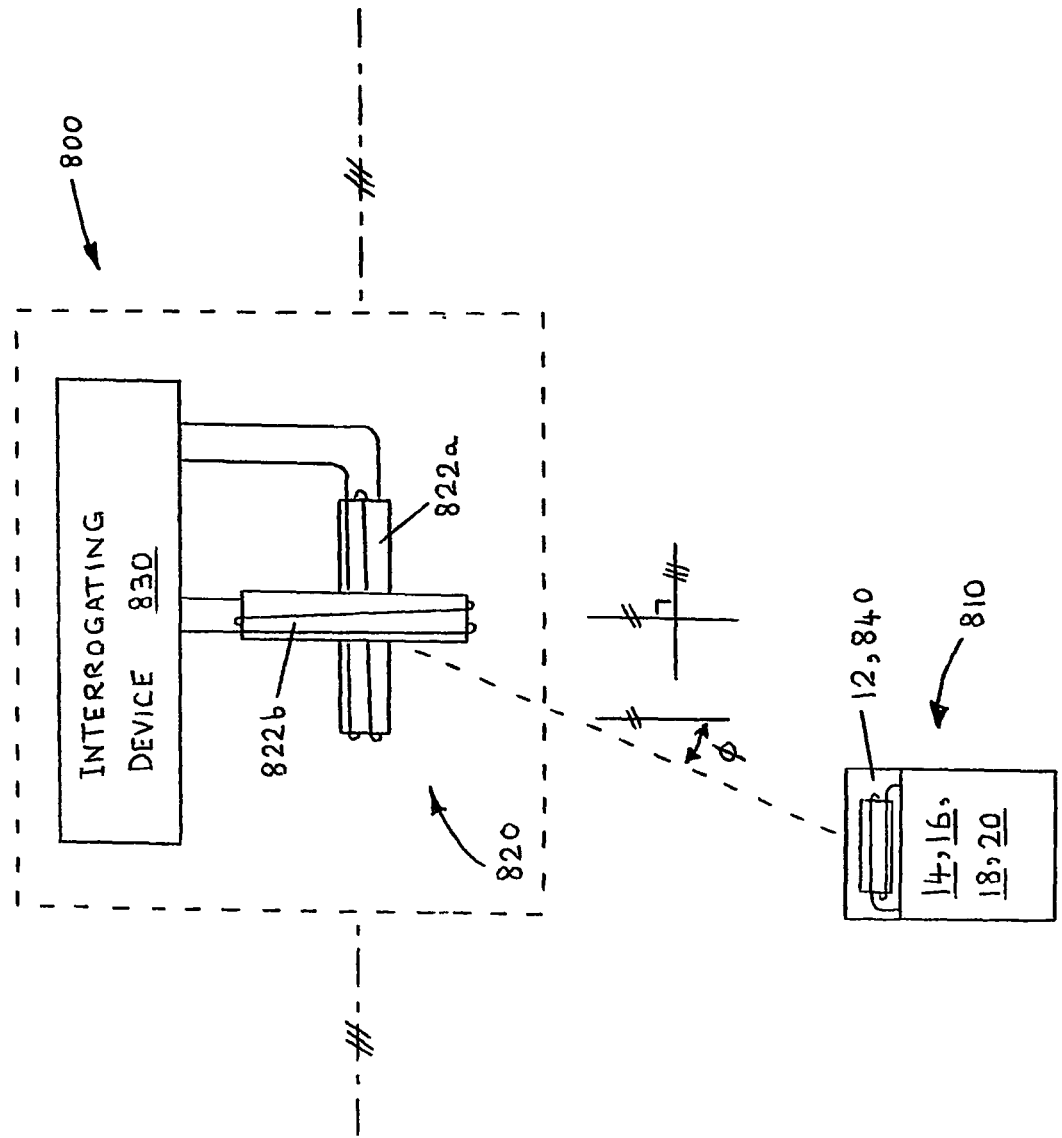

FIG. 11 is a circuit diagram of a modified version of the tag illustrated in FIG. 10 including direct load modulation to an input of the tag; and FIG. 12 is a schematic diagram of an alternative interrogating device including dual orthogonally disposed loop antennae, the device interrogating a tag as shown in FIG. 2 equipped with a loop antenna appropriate for receiving radiation from the alternative interrogating device.

Figure 1:
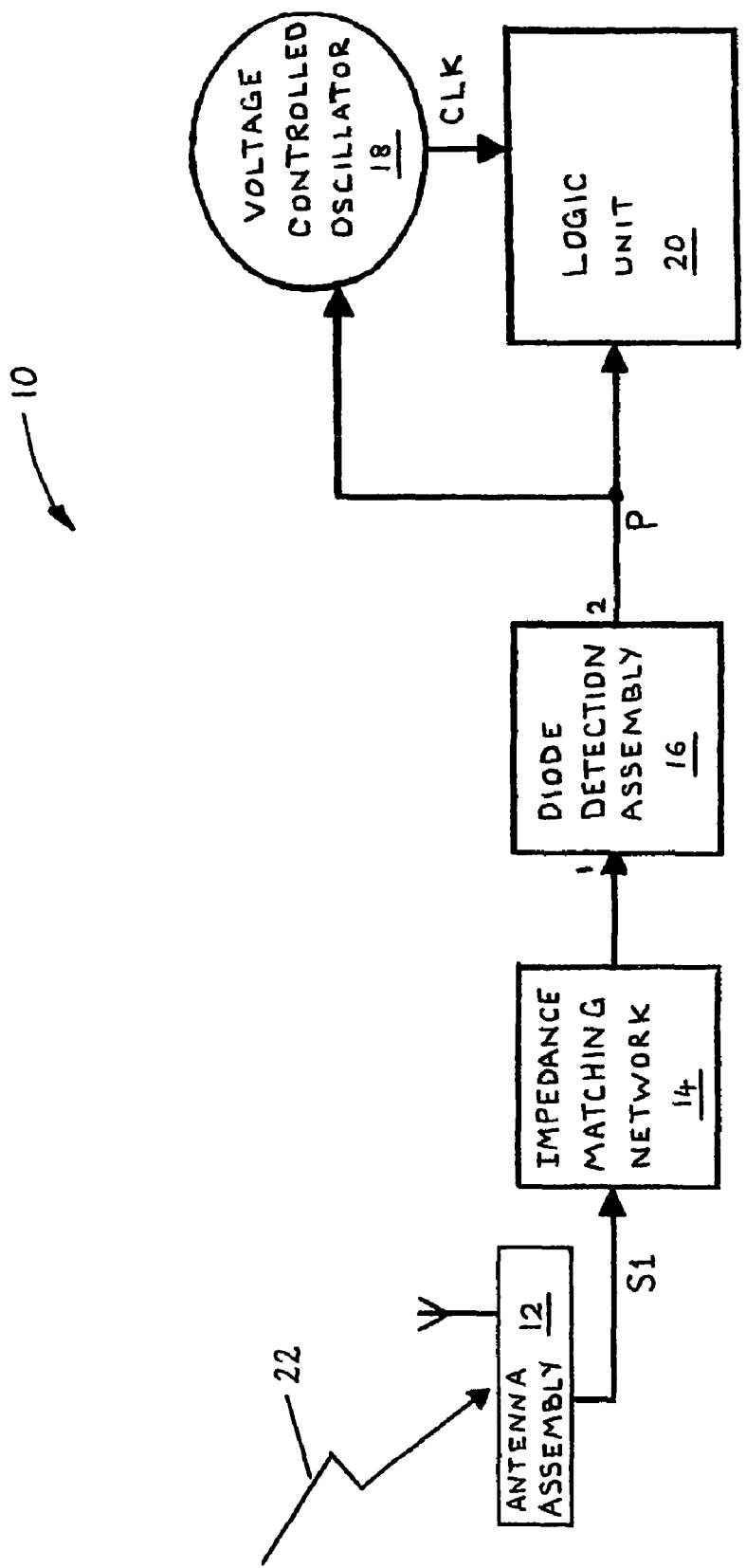
FIG. 1 is a schematic block diagram of principal sections of a variable frequency tag according to the invention.

Referring to FIG. 1, there is shown principal sections of a variable frequency tag according to the invention; the tag is indicated generally by 10. The tag 10 comprises a plurality of interconnected sections, namely an antenna assembly 12, an impedance matching network 14, a diode detection assembly 16, a voltage controlled oscillator 18 and a logic unit 20. The logic unit 20 can be implemented as a state machine, for example using ROM and associated logic gates; alternatively, the logic unit 20 can be implemented by using a microcontroller device. The logic unit 20 incorporates complementary metal oxide semiconductor (CMOS) devices whose current consumption increases as their clocking rate is increased.

Interconnection of the sections of the tag 10 will now be described.

The antenna assembly 12 is coupled via the matching network 14 to a first port of the diode detection assembly 16. The detection assembly 16 comprises a second port which is connected to a power input of the voltage controlled oscillator 18 and also to a power input of the logic unit 20. A clock signal CLK output of the oscillator 18 is coupled to a clock input of the logic unit 20.

Operation of the tag 10 will now be described.

The tag 10 receives interrogating radiation 22 at the antenna assembly 12 and generates a corresponding received signal S1. The interrogating radiation 22 can, for example, be microwave radiation having a carrier frequency in the order of 2.5 GHz, namely in a range 500 MHz to 90 GHz. Alternatively, the radiation 22 can be high frequency radiation having a carrier frequency in the order of 13.56 MHz, namely in a range of 5 MHz to 100 MHz. As a further alternative, the radiation 22 can be low frequency radiation having a carrier frequency in the order of 125 kHz, namely in a range of 20 kHz to 500 kHz where inductive coupling effects are significant.

The signal S1 passes through the network 14 to the diode assembly 16 whereat it is rectified to provide a substantially unipolar but fluctuating potential difference P which is applied to the voltage controlled oscillator 18 and to the logic unit 20. The oscillator 18 generates a clock signal CLK whose frequency F is a function of the potential difference P; the frequency F increases as the potential difference P increases. Preferably, the frequency F is substantially linearly related, for example to within a linearity deviation of 20%, to the potential difference P. Alternatively, the frequency F can be made to vary in a non-linear manner, for example in a substantially logarithmic manner, in relation to changes in the potential difference P.

The logic unit 20 is clocked by the clock signal CLK and is designed to provide a variable power load to the diode assembly 16, for example by way of an input/output terminal of the logic unit 20 being coupled to the second port of the diode assembly 16, thereby modulating the potential difference P. The logic unit 20 is arranged to modulate the difference P in a temporal manner depending upon a signature code programmed into the unit 20 which uniquely distinguishes it from other similar tags. The rate at which the logic unit 20 modulates the difference P is determined by the frequency of the clock signal CLK. Moreover, as elucidated in the foregoing, power consumption of the logic unit 20, which accounts for majority of power dissipated within the tag 10, increases as the frequency of the clock signal CLK increases. Thus, when the tag 10 is operated at a relatively longer distance from a tag interrogating device, the oscillator 18 outputs the clock signal CLK at a relatively lower frequency and the logic unit 20 consumes relatively less power. Conversely, when the tag 10 is operated at a relatively shorter distance from the interrogating device, the oscillator 18 outputs the clock signal CLK at a relatively higher frequency and the logic unit 20 consumes relatively more power, the tag 10 thereby is also capable of responding faster back to the interrogating device. Thus, by deliberately reducing the frequency of the clock signal CLK when the tag 10 is operating at a relatively greater distance from the interrogating device, the tag 10 is thereby provided with enhanced operating range compared to a conventional tag whose operating clock frequency is maintained substantially constant irrespective of operating distance from an associated interrogating device. The interrogating device detects interrogating radiation received at the tag 10 which is reflected therefrom and received back at the interrogating device; temporal variations in the amount of radiation reflected is determined predominantly by instantaneous power consumed by the logic unit 20.

The inventors have appreciated that design of the tag 10 is not trivial and several design aspects have to be taken into consideration, namely:

(a) the diode assembly 16 exhibits an input impedance at its first port which is a function of its video resistance which, in turn, is a function of its output current delivered at the second port;

(b) the potential difference P provided at the second port of the diode assembly 16 is a function of output current delivered from the second port on account of assembly 16 exhibiting a finite output resistance; and (c) the logic unit 20, by way of its CMOS-type construction, exhibits a power consumption which is substantially a function of the square of the potential difference P and also substantially linearly or logarithmically related, at a given potential difference P, to the frequency of the signal CLK and tag 10 circuit capacitance C which is substantially constant.

Thus, power consumption Q of the tag 10 can be determined to a first order from Equation 1 (Eq. 1):

$$Q = kF\left(\frac{1}{2}CP^2\right) \qquad \text{Eq. 1}$$

where k=a proportionality constant; and

F=f (P) where f is a function, for example a substantially linear or logarithmic function.

It will be appreciated that several relationships, as defined by the aforesaid function f, between the potential difference P and the frequency of the signal CLK are possible depending upon design of the voltage controlled oscillator 18.

There are a number of benefits arising from operating the tag 10 with a variable frequency clock rate, namely:

(a) the tag 10 can be provided with an extended spatial operating range whilst still responding to an associated interrogating device; and (b) the tag 10 provides a response which is frequency shifted depending upon operating distance which assists to resolve contention issues when several tags of similar design to the tag 10 are interrogated simultaneously.

The sections of the tag 10 schematically illustrated in FIG. 1 will now be described in further detail with reference to FIG. 2.

The antenna assembly 12 comprises a folded dipole antenna for receiving the radiation 22 and generating the signal S1 between first and second terminals of the assembly 12. The impedance matching network 14 is implemented by a blocking capacitor 24. The diode detection assembly 16 is implemented by a dual-zero-bias Schottky diode detector 26 comprising a pair of serially connected Schottky diodes and a bypass capacitor 28. Moreover, the logic unit 20 is implemented as a CMOS microcontroller type PIC12C509ESA manufactured by Microchip Technology Inc., a company based in the USA.

The voltage controlled oscillator 18 is implemented as a "ring-of-three" oscillator comprising a series of first, second and third inverting logic gates 30a, 30b, 30c respectively connected in a feedback loop configuration as illustrated. Moreover, the oscillator 18 is preferably implemented using a standard proprietary 74HC04 CMOS device. Furthermore, the "ring-of-three" oscillator oscillates at a frequency determined by the propagation delay of its inverting logic gates which is strongly dependent upon the potential difference P generated by the diode assembly 16.

Interconnection of the sections of the tag 10 will now be described with reference to FIG. 2.

The first terminal of the antenna assembly 12 is connected to a first electrode of the blocking capacitor 24. A second electrode of the capacitor 24 is coupled to a mid-anode-cathode terminal of the dual Schottky detector 26 as illustrated. A cathode electrode of the detector 26 is connected to a first electrode of the bypass capacitor 28, to an input/output (I/O) terminal and a positive supply VDD terminal of the microcontroller and also to a positive supply VDD terminal of the aforesaid 74HC04 device. An anode electrode of the detector 26 is coupled to the second terminal of the antenna assembly 12, to a second electrode of the bypass capacitor 28 and to ground VSS terminals of the microcontroller and the 74HC04 device. The 74HC04 device comprises a third terminal whereat the clock signal CLK is output, the third terminal coupled to a microcontroller clock input terminal of the microcontroller.

Operation of the tag 10 will now be described with reference to FIG. 2.

An interrogating device (not shown in FIG. 2) emits the interrogating radiation 22 which propagates to the tag 10 where it is received at the antenna assembly 12. The assembly 12 converts the radiation 22 received thereat into the signal S1 which is coupled through the blocking capacitor 24 to the dual Schottky detector 26 which rectifies the signal S1 to generate a unipolar potential, namely the potential difference P, across the bypass capacitor 28. The potential difference P powers the 74HC04 device which oscillates and outputs the clock signal CLK to the microcontroller. The difference P also powers the microcontroller into operation.

The microcontroller is pre-programmed with a signature code which is unique for the tag 10. The microcontroller switches its input/output terminal I/O in a periodic manner governed by the signature code to exhibit a temporally varying load across the bypass capacitor 28. Variations in the load in turn influence an impedance presented by the dual Schottky detector 26 via the blocking capacitor 24 to the antenna assembly 12 and thereby a proportion of the radiation 22 which is reflected from the antenna assembly 12 back to the interrogating device. The interrogating device is receptive to radiation reflected back thereto, converts this reflected radiation to a signal which is then processed to yield the temporal fluctuations and hence the preprogrammed signature code of the tag 10. The interrogating device is therefore capable of determining presence of the tag 10 and its specific identity from its signature code.

It will be appreciated that the tag 10 illustrated in FIG. 2 can be modified without departing from the scope of the invention. For example, the dual Schottky detector 26, the 74HC04 device and the microcontroller can preferably be implemented using a single application specific integrated circuit (ASIC); such an approach limits the number of parts needed to be assembled to manufacture the tag 10 and thereby reduces its fabrication cost. Moreover, the antenna assembly 12 can be preferably inexpensively implemented using etched or printed metal film conductors.

The tag 10 can be encapsulated to protect and isolate it from its environs. Such encapsulation is important where, for example, the tag 10 is used to label items of clothing in dry cleaning industries. In these industries, items of clothing are subject to one or more of elevated temperature and copious quantities of organic solvent; the items have to be uniquely identifiable for returning to their respective clients after cleaning. The microcontroller preferably includes non-volatile memory, for example an $E^2$PROM, so that it can be programmed with a unique signature code; this enables the tag 10 to be mass-produced and then customized post-production.

It will be appreciated that the tag 10 can be modified to include a local source of power, for example a lithium button cell. The modified tag would retain the characteristic that its voltage controlled oscillator 18 outputs its clock signal CLK at a frequency which is dependent on a supply potential provided by the aforesaid button cell. Operating lifetime of the modified tag can thereby be extended by reducing power consumed from the cell when expiration of the cell is imminent, namely when its internal resistance is tending to increase.

It will also be appreciated that the microcontroller can have one or more sensors attached thereto for sensing environs of the tag 10. Such sensors can, for example, be one or more of temperature sensors, gas sensors and biosensors so that the tag 10 can be used to remotely monitor the condition or maturity of products which the tags are used to uniquely identify. In this respect, the tag 10 can beneficially be used in the brewing and food processing industries. Moreover, where the sensors are indicative of wear, the tag 10 can be used to signal when a part associated therewith is worn and needs replacing, for example in an automotive application.

Figure 3:
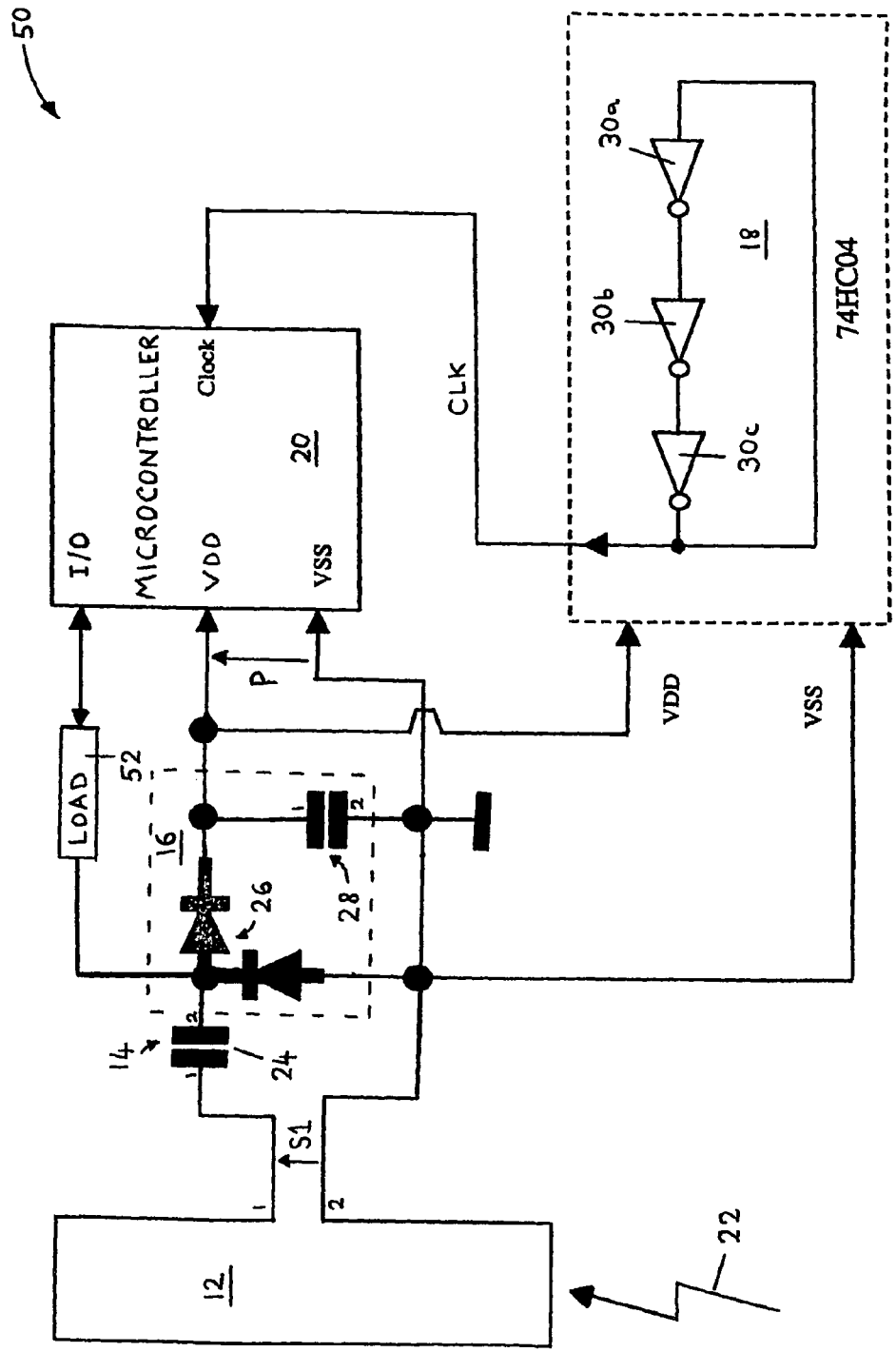
FIG. 3 is a circuit diagram illustrating a first alternative implementation of the tag shown in FIG. 2 employing direct tag input loading.

In FIG. 3, a first alternative version of the tag 10 is indicated by 50. The first alternative tag 50 is similar to the tag 10 except that the input/output (I/O) terminal is connected via a load resistor 52 to the second electrode of the capacitor 24. In operation, the microcontroller employs the input/output (I/O) terminal to modulate a potential developed across the load resistor 52 and thereby apply load modulation to the antenna 12 via the capacitor 24. By applying such load modulation, a proportion of the radiation 22 reflected from the tag 50 is correspondingly modulated.

The first alternative tag 50 provides the benefit that it can load modulate the radiation 22 at a greater frequency than is possible in the tag 10. The greater modulation frequency arises because the microcontroller in the first alternative tag 50 does not need to vary its potential difference P which is buffered by the capacitor 28. Thus, the first alternative tag 50 is capable of responding at an enhanced data rate to the interrogating radiation 22 compared to the tag 10.

Figure 4:
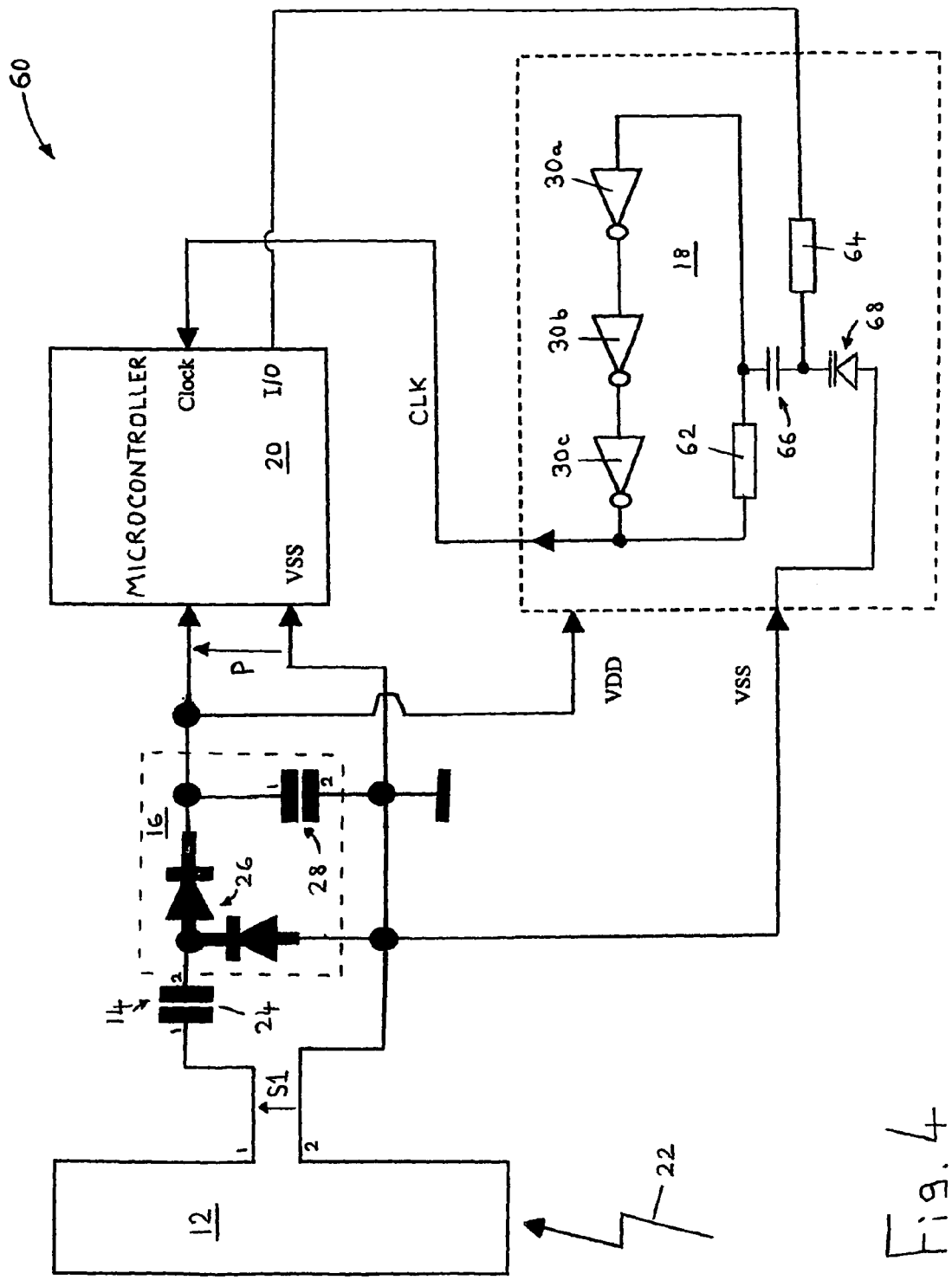
FIG. 4 is a circuit diagram illustrating a second alternative implementation of the tag shown in FIG. 2 employing oscillator frequency modulation loading.

In FIG. 4, a second alternative version of the tag 10 is indicated by 60. The second alternative tag 60 is similar to the tag 10 except that the oscillator 18 further incorporates a first resistor 62, a second resistor 64, a blocking capacitor 66 and a varicap diode 68. The first, second and third logic inverter gates 30$a$, 30$b$, 30$c$ respectively are connected in series starting with the first logic gate 30$a$ and ending with the third logic gate 30$c$. An output from the third gate 30$c$ is connected to the clock input of the microcontroller and via the first resistor 62 to an input of the first gate 30$a$ and also via the capacitor 66 to a cathode electrode of the varicap diode 68. The cathode electrode is coupled through the second resistor 64 to the input/output (I/O) terminal of the microcontroller.

In operation, the second alternative tag 60 receives the radiation 22 at its antenna assembly 12 and generates the corresponding received signal S1. The signal S1 is coupled through the capacitor 24 to the detection assembly 16 which, in turn, rectifies the signal S1 to generate the potential difference P. The potential difference P energises the oscillator 18 and also the microcontroller. The oscillator 18 generates the clock signal CLK which clocks the microcontroller. The microcontroller periodically outputs its signature code at its input/output (I/O) terminal which modulates capacitance exhibited by the varicap diode 68 and hence modulates the frequency at which the oscillator 18 oscillates. As power consumption of the tag 60, arising principally within the microcontroller, varies in response to the oscillating frequency of the oscillator, a varying load modulated by the signature code is presented to the detection assembly 16 which, in turn, modulates a proportion of the radiation 22 reflected from the tag 60.

Figure 5:
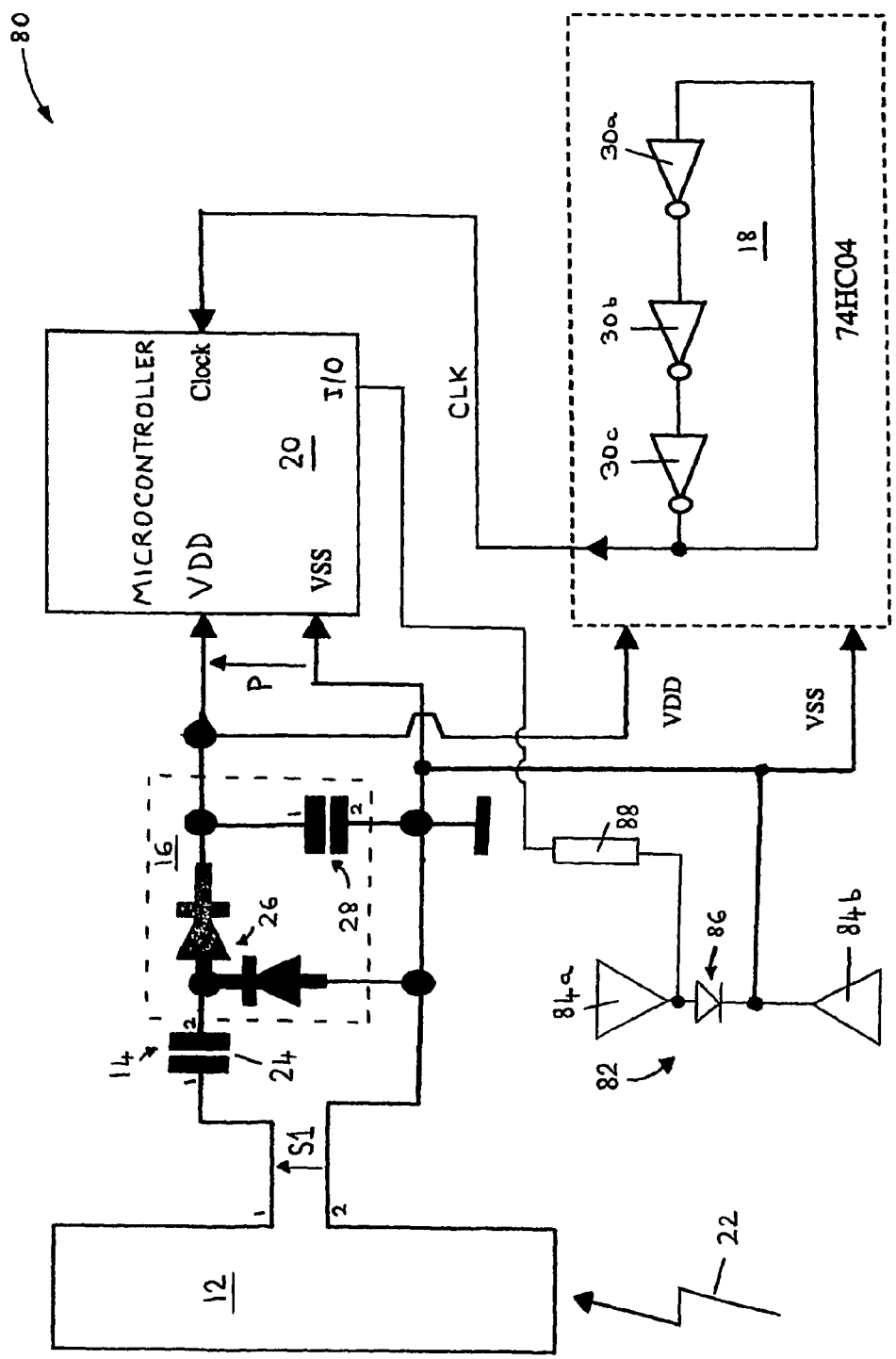
FIG. 5 is a circuit diagram illustrating a third alternative implementation of the tag shown in FIG. 2 employing a auxiliary load-modulated antenna for providing reflected radiation.

In FIG. 5, a third alternative version of the tag 10 is indicated by 80. The third alternative tag 80 is identical to the tag 10 except that it further includes an auxiliary dipole antenna 82 comprising first and second dipole patches 84$a$, 84$b$ mutually coupled via a pin diode 86. The second dipole patch 84$b$ is connected to a cathode electrode of the diode 86 and also to the second terminal of the antenna assembly 12. The first dipole patch 84$a$ is coupled to an anode electrode of the pin diode 86 and also via a bias resistor 88 to the input/output (I/O) terminal of the microcontroller.

The third alternative tag 80 operates in an identical manner to the tag 10 except that the microcontroller is operable to modulate a current flowing through the pin diode 86 and thereby modulate its dynamic resistivity and hence modulate a proportion of the radiation 22 received at the auxiliary antenna 82 which is reflected back.

It will be appreciated that the third alternative tag 80 can be further modified by replacing the pin diode 86 with a gallium arsenide field effect transistor (GaAs-FET) configured to function as a negative resistance and thereby provide an enhanced degree of reflected radiation from the auxiliary antenna 82. Moreover, the antenna assembly 12 and the auxiliary antenna 82 can each be tuned to different radiation frequencies so that when the third alternative tag 80 is interrogated by the radiation comprising first and second radiation components, the first component couples efficiently through the antenna assembly 12 and energizing the tag 80 and the second component couples efficiently into the auxiliary antenna 82 and is load modulated therein. The third tag 80 also provides the benefit that reflected radiation from the tag 80 can be modulated more rapidly than the tag 10.

The third tag 80 can be further modified by including a surface acoustic wave (SAW) oscillator comprising a SAW resonator and an associated gain component such as transistor. In such a further modified tag, the SAW oscillator can be energized by the potential difference P and gated from the microcontroller, in a manner conveying the signature code, with a relatively low duty cycle, for example powered for 0.5 to 5% of the time, to oscillate and thereby generate a signal for emission as reflected radiation from the auxiliary antenna 82. Such a further modified tag provides the advantage that it can respond back at a frequency different to the frequency of the radiation 22 used to energize the further modified tag.

The third tag 80 can be additionally modified so that the microcontroller includes an E$^2$PROM, for example for providing non-volatile memory for storing the tag's signature code. The microcontroller can be arranged to deliberately slow down the oscillator 18 to allow a greater potential difference P to develop prior to performing an energy-intensive function, for example reprogramming the E$^2$PROM with a new signature code.

Figure 6:
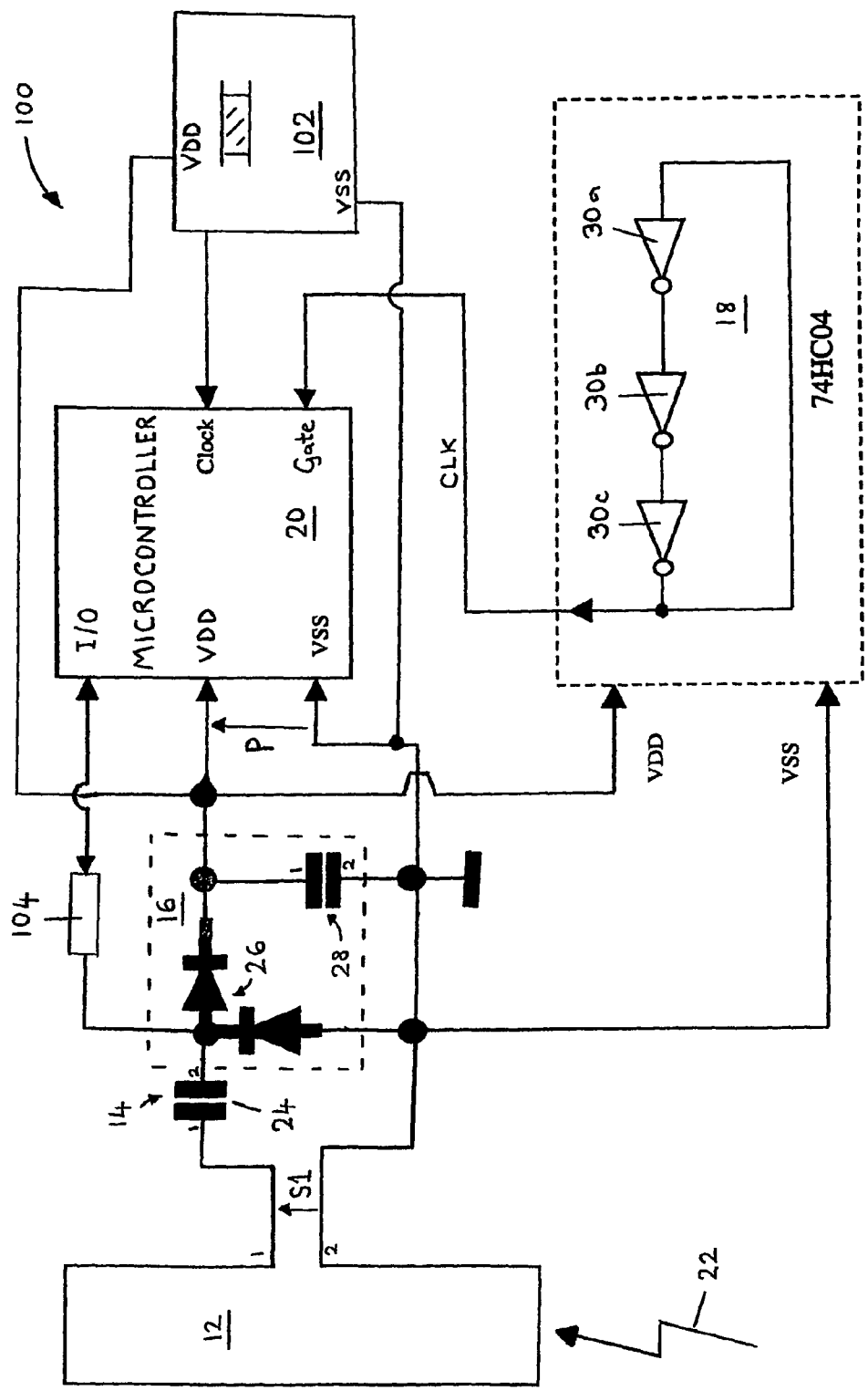
FIG. 6 is a circuit diagram illustrating a fourth alternative implementation of the tag shown on FIG. 2 employing dual oscillators.

In FIG. 6, a fourth alternative version of the tag 10 is indicated by 100. The fourth alternative tag 100 is identical to the tag 10 except that it further includes a logic oscillator 102 coupled to the microcontroller clock input. Moreover, the oscillator 18 is coupled to a gating input of the microcontroller. Furthermore, the input/output (I/O) terminal of the microcontroller is coupled via a load resistor 104 to the detection assembly 16 to load modulate it directly as elucidated in the foregoing.

In operation, the fourth tag 100 receives the radiation 22 which is coupled via the antenna assembly 12, the capacitor 24 and the detection assembly 16 to generate the potential difference P. The potential P energizes the oscillators 18, 102 and also the microcontroller. The logic oscillator 102 is designed to oscillate at a substantially constant frequency irrespective of fluctuations in the potential P and hence clock the controller at a substantially constant rate. In contrast, the oscillator 18 oscillates at a frequency which is highly dependent on the potential P, for example substantially in a linear or logarithmic manner. The logic oscillator 102 ensures that the microcontroller operates at a stable frequency and therefore outputs its signature code at a predictable rate. The microcontroller employs the clock signal that it receives from the oscillator 18 to determine how frequently it repeats the signature code. The fourth tag 100 provides the benefit that the signature code is output at a predictable rate thereby easing signal processing operations at devices interrogating the fourth tag 100. As a result of the frequency of repetition of the code being dependent on the potential difference P and the fact that the fourth tag 100 spends most of its active time idling, for example 90% or more, between outputting its signature code, contention is circumvented because a plurality of the fourth tags 100 operating concurrently will be outputting their signature codes asynchronously; there will be instances when only one of the plurality of tags is outputting its signature code which can therefore be unambiguously identified by interrogating devices interrogating the plurality of fourth tags.

In practice, tags according to the design of the tags 10, 50, 60, 80, 100 can be manufactured in large numbers, for example in millions, in specially adapted production machinery. In use, many such tags will often simultaneously be within range of the aforementioned interrogating device. It is an important aspect of the interrogating device that it can cope with contention between tags when attempting to simultaneously interrogate a plurality thereof. Coping with such contention is an important practical aspect of any commercial tagging system.

Figure 7:
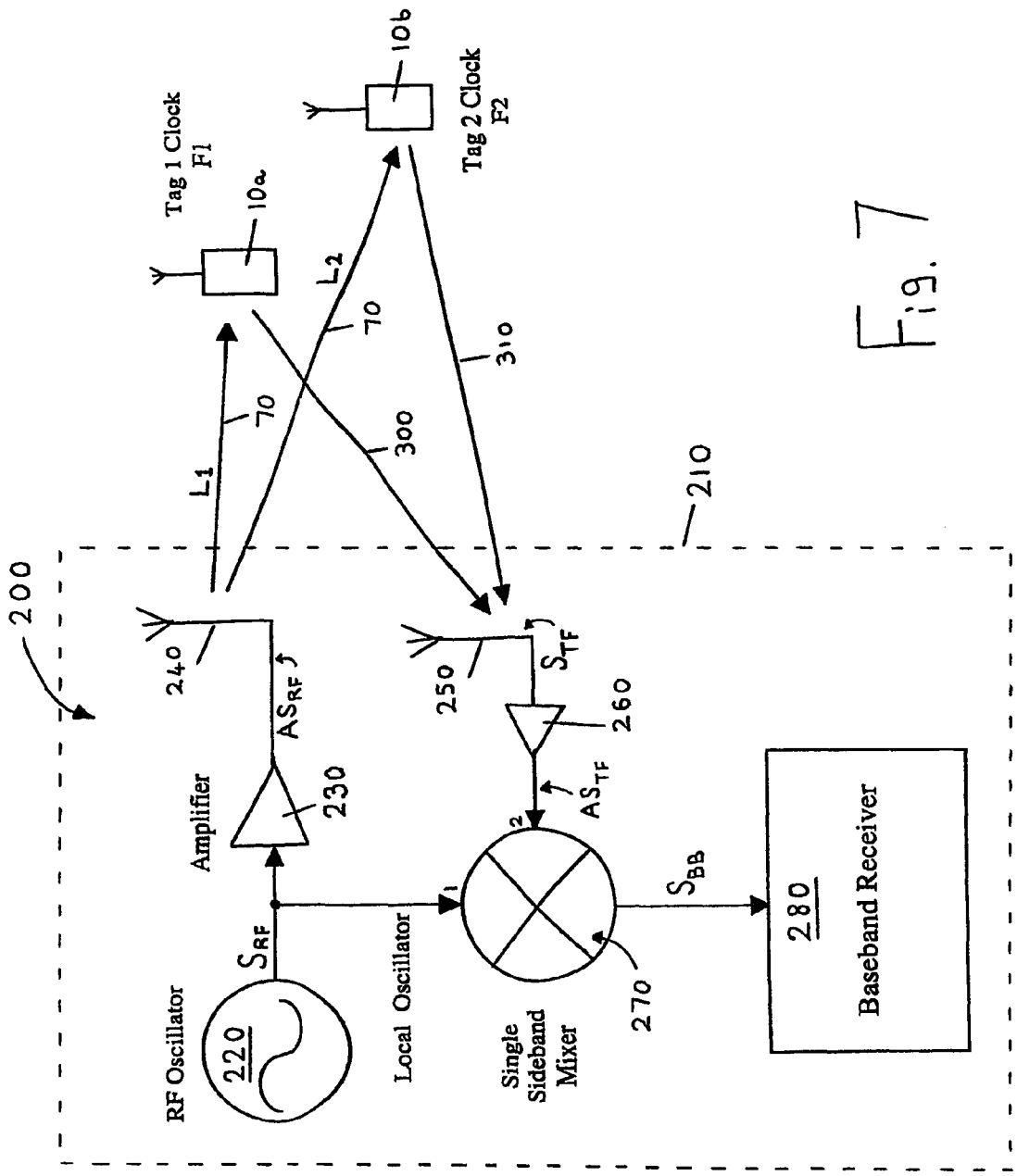
FIG. 7 is an illustration of an interrogating device according to the invention usable for interrogating a plurality of tags of the type shown in FIGS. 2, 3, 4, 5, 6.

Referring next to FIG. 7, there is shown an interrogation device according to the invention usable for interrogating a plurality of tags 10a, 10b of similar design to the tag 10 illustrated in FIGS. 1 and 2; the interrogating device is indicated generally by 200 and shown included within a dashed frame 210. The interrogating device 200 comprises a radio frequency oscillator 220, a power amplifier 230, a transmitter antenna 240, a receiver antenna 250, a receiver amplifier 260, a single side-band mixer 270, and a baseband receiver 280 including digital signal processors and digital filters.

Interconnection within the interrogating device 200 will now be described.

The oscillator 220 includes a radio frequency signal $S_{RF}$ output, the signal $S_{RF}$ being matched to a radiation frequency range over which the tag 10 is responsive. The signal $S_{RF}$ output is coupled to a signal input of the power amplifier 230 and to a first input port of the mixer 270. An output from the power amplifier 230 is coupled to the transmitter antenna 240. Likewise, the receiver antenna 250 is connected to an input port of the receiver amplifier 260. An output of the receiver 260 is coupled to a second input port of the mixer 270. An output port of the mixer 270 is connected to a signal input of the baseband receiver 280.

Operation of the device 200 interrogating the tags 10a, 10b will now be described with reference to FIG. 7. The tags 10a, 10b are spatially distributed at distances of L1, L2 respectively from the transmitter antenna 240.

The oscillator 220 generates the signal $S_{RF}$. The signal $S_{RF}$ propagates to the amplifier 230 and to the first port of the mixer 270. The amplifier 230 amplifies the signal $S_{RF}$ to produce a corresponding amplified signal $AS_{RF}$ which passes to the transmitter antenna 240 wherefrom it is radiated as the radiation 70 towards the tags 10a, 10b. The radiation propagates to the tags 10a, 10b to generate received signals S1 therein that are rectified to generate corresponding supply potential differences P in the tags 10a, 10b for energising them. The tags 10a, 10b function as described in the foregoing with the tags 10a, 10b having their associated voltage controlled oscillators 50 operating at clocking frequencies of F1 and F2 respectively. In FIG. 7, the distance L1 is shorter than the distance L2 which results in the frequency F1 being greater than the frequency F2. In other words, the tag 10a is clocked at a greater rate than the tag 10b because the tag 10a is relatively nearer the transmitter antenna 240 than the tag 10b.

The tags 10a, 10b modulate their respective radiation reflectivities to provide reflected radiation 300, 310 respectively. The radiation 300, 310 propagates from the tags 10a, 10b respectively to the receiver antenna 250 at which the radiation 300, 310 is converted into a corresponding received signal $S_{TF}$. The signal $S_{TF}$ propagates to the receiver amplifier 260 in which it is amplified to generate a corresponding amplified signal $AS_{TF}$ which passes to the second input port of the mixer 270. The mixer 270 then mixes, namely multiplies together to generate product components, the signals $AS_{TF}$, $S_{RF}$ to generate a baseband signal $S_{BB}$ which then propagates to the baseband receiver 280 to undergo further signal processing which will be described later.

Figure 8:
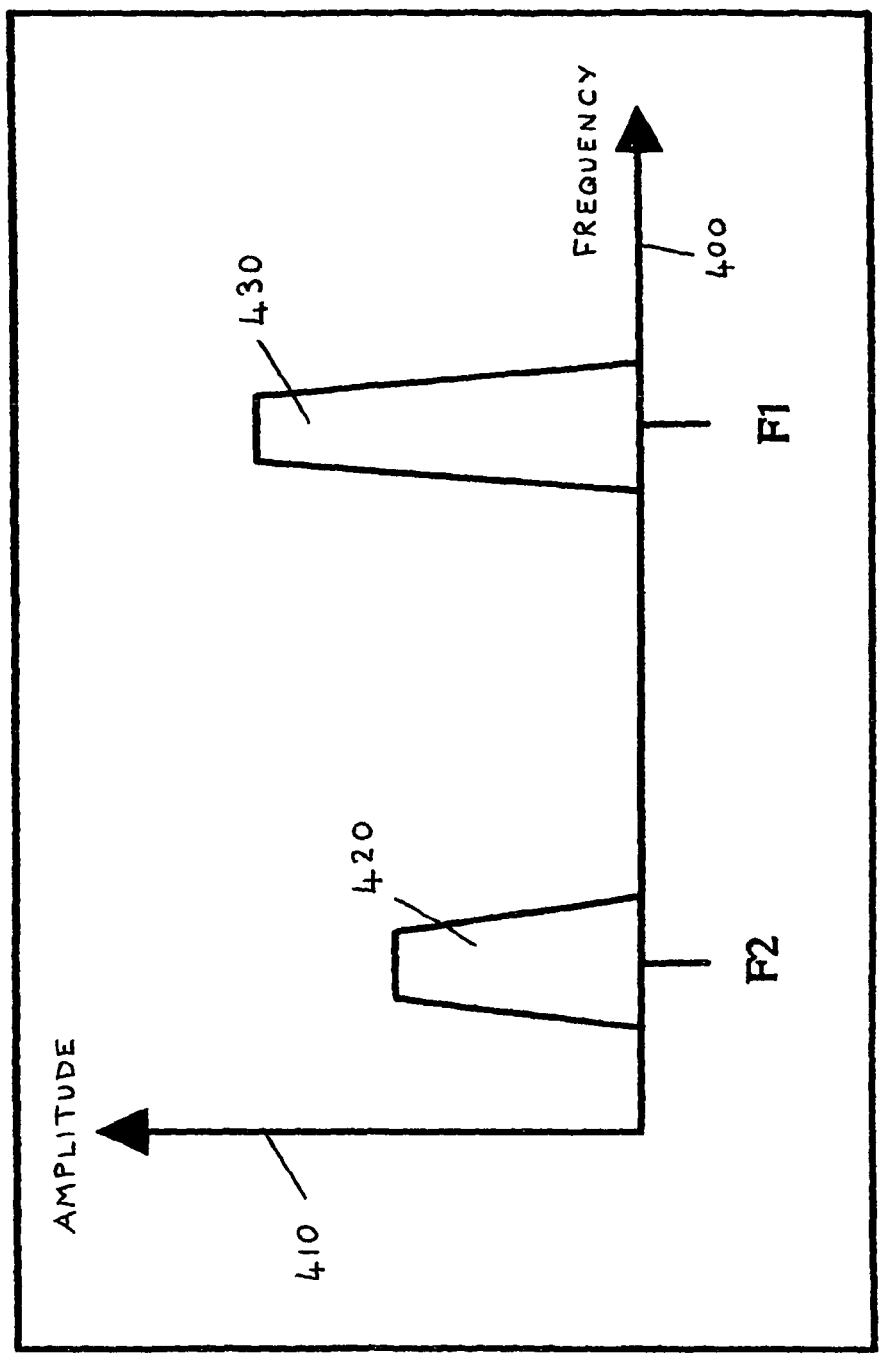
FIG. 8 is a graph illustrating a spectral response of radiation received by the device shown in FIG. 7.

Referring now to FIG. 8, there is shown a graph illustrating a spectral response of the signal $S_{BB}$. The graph includes an abscissa axis 400 indicating frequency increasing from left to right, and an ordinate axis 410 indicating increasing signal amplitude from bottom to top. The signal $S_{BB}$ comprises a first sideband component 420 arising from the tag 10b and also a second sideband component 430 arising from the tag 10a. As a consequence of the tag 10b being at a greater distance from the transmitter antenna 240 than the tag 10a, the first sideband component 420 is at a relatively lower frequency than the component 430 in the spectral response.

The components 420, 430 include information concerning the signature codes of the tags 10b, 10a respectively; moreover, the components 420, 430 can include additional information from the tags 10b, 10a, for example sensor measurements from sensors connected to or incorporated into the tags 10b, 10a. The receiver 280 isolates the components 420, 430 by using frequency-selective digital filters and then extracts the signature codes therefrom. Techniques for performing such filtration and extraction are known in the art of electronic circuit design.

The tags 10a, 10b can be designed to modulate their respective radiation reflectivities in the form of Manchester bi-phase encoded data; when encoding data using Manchester bi-phase techniques, data and clock signals are exclusively OR-ed to generate corresponding Manchester bi-phase encoded data. Alternative forms of modulation which can be employed include FM0 and FM1 formats, FM0 and FM1 being generally known within the technical field of radio communication systems.

When many tags similar in design to the tag 10 are interrogated simultaneously from the device 200, an ambiguous contentious situation can arise where two or more tags are equidistant from the transmitter antenna 240. When such contention arises, spectral components from the tags processed by the receiver 280 will overlap and will be uninterpretable. The inventor has appreciated that there are a number of ways in which the device 200 and the tags 10a, 10b can be operated to address the contention.

In a first approach, the tags 10a, 10b are designed such that their respective microcontrollers do not continuously modulate radiation reflected from their tags but for only a fraction of the time during which they are interrogated. As the clocking frequencies of the tags 10a, 10b will be slightly different in practice, they will function asynchronously such that at certain times they will be modulating reflected radiation alternately. The receiver 280 will observe such alternation as a single component in the spectral response whose signature code is alternating. Processors in the receiver 280 can be programmed to identify such alternation of signature code and interpret it to denote the presence of more than one responding tag equidistant from the transmitter antenna 240.

Figure 9:
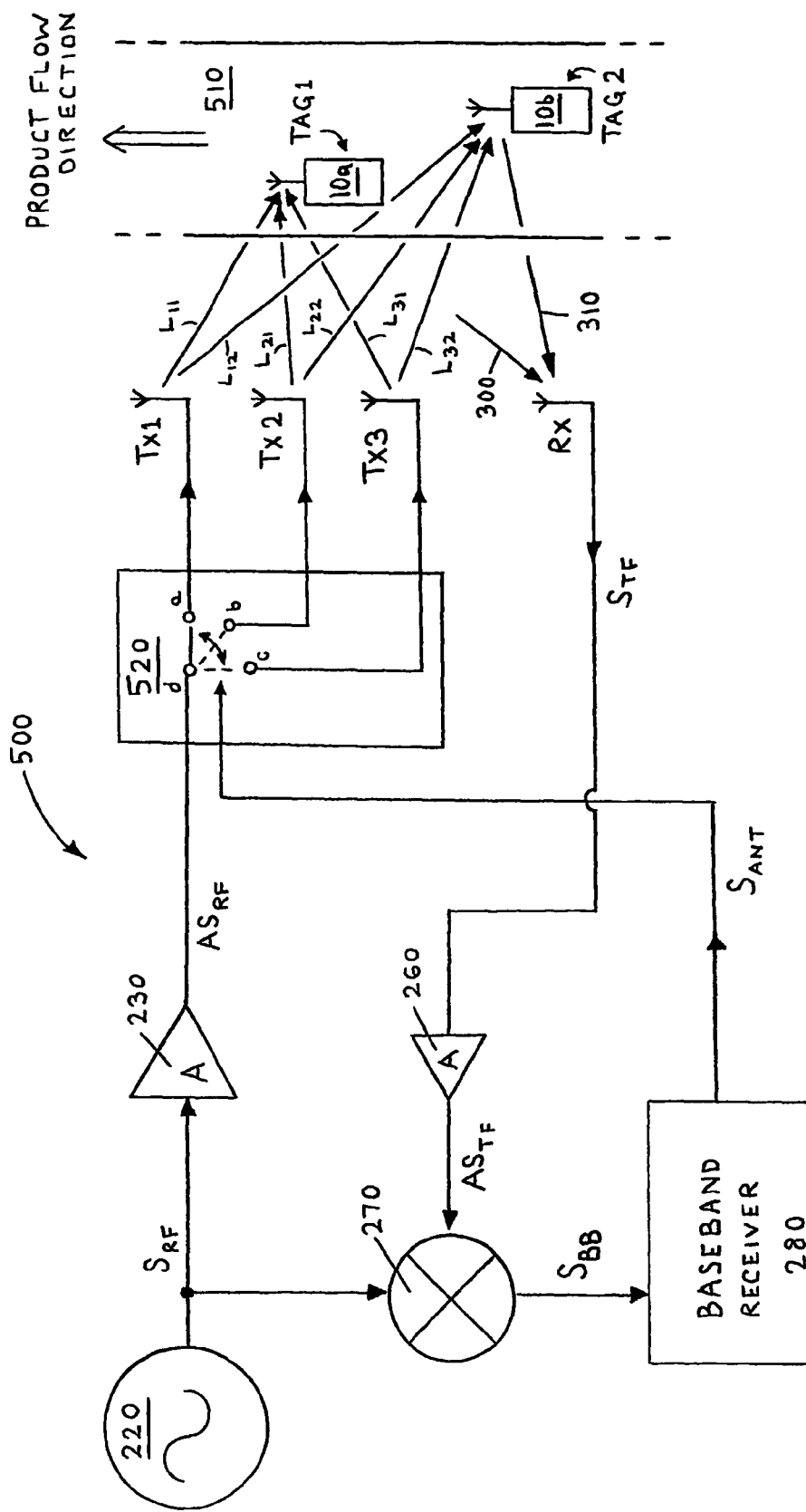
FIG. 9 is an illustration of a modified version of the interrogating device shown in FIG. 7, the modified version including multiple transmitter antennae for resolving contention problems when a plurality of tags as illustrated in FIGS. 1 to 6 are interrogated simultaneously.

In a second approach, the device 200 illustrated in FIG. 7 is modified into an alternative interrogating device as shown in FIG. 9; the alternative device is indicated generally by 500. The device 500 includes three transmitter antennae assemblies TX1, TX2, TX3 connected to switching terminals a, b, c respectively of a switch unit 520. A wiper terminal d of the switch unit 520 is connected to the output of the power amplifier 230. The baseband receiver 280 is also modified to provide an antenna select signal $S_{ANT}$ which is coupled to the switch unit 520 whereat it is used to control connection of the wiper terminal d to a preferred one of the aforementioned three switch terminals a, b,c.

The alternative device 500 additionally includes a movable conveyor belt 510 onto which products and their associated attached tags 10a, 10b are transported relative to the antennae assemblies TX1, TX2, TX3. Distances from the antennae assemblies TX1, TX2, TX3 are denoted in FIG. 9 by $L_{ij}$ where a subscript i is indicative of antenna assembly and a subscript j is indicative of tag identity.

In operation, the device 500 uses the antennae assemblies TX1, TX2, TX3 in sequence to interrogate the tags 10a, 10b. The assemblies TX1, TX2, TX3 are individually sequentially selected by way of the $S_{ANT}$ signal controlling the switch unit 520; for example, the assembly TX1 is selected when the $S_{ANT}$ signal sets the switch unit 520 to connect its wiper terminal d to the terminal a. It can be seen from FIG. 9 that each of the tags 10a, 10b cannot be equidistant from the antenna assemblies TX1, TX2, TX3 when the assemblies are arranged substantially co-linearly. As a consequence of such inequality in distance, heterodyned reflected components from the tags 10a, 10b as illustrated in FIG. 8 are moved along the abscissa axis 400 as the baseband receiver 280 selects through the antennae assemblies TX1, TX2, TX3. Thus, where frequency overlap of components 420, 430 arises for one of the antennae assemblies, the components are resolved in frequency when another of the antennae assemblies are used. Thus, the baseband receiver 280 is capable of isolating heterodyned components for signal processing purposes where contention arises on account of two or more tags being equidistant from one or more of the antennae assemblies.

If required, device 500 can be further modified so that it uses one of more of the antennae assemblies TX1, TX2, TX3 to monitor the tags 10a, 10b at intervals as they are moved along the conveyor belt 510; as the tags 10a, 10b are moved along, their relative distances from one or more of the antennae assemblies TX1, TX2, TX3 changes thereby moving the components 420, 430 around along the abscissa axis 400. As a consequence of such movement, contention between the tags 10a, 10b at one instant are resolvable at another instant when the tags 10a, 10b move along the conveyor belt 510.

In a third approach to addressing contention, the devices 200, 500 and the microcontrollers of the tags 10a, 10b are modified. The devices 200, 500 are modified so that each incorporates a connection from its respective baseband receiver 280 to its radio frequency oscillator 220 for inserting synchronisation pulses at intervals into the signal $S_{RF}$. The microcontrollers in the tags 10a, 10b are also modified so that, in operation, they monitor the potential difference P applied thereto for the presence of the aforesaid synchronisation pulses. If one or more of the tags 10a, 10b do not repetitively detect the synchronisation pulses within a detection time window after outputting their signature code to modulate their potential difference P, the one or more tags 10a, 10b switch themselves for a period of time into an inactive state where they refrain from outputting their signature code. The devices 200, 500 are arranged to output synchronisation pulses at a periodic interval related to the clocking rate of a particular code of interest each time after the devices 200, 500 detect the presence of the signature code in the signal $S_{BB}$. By adopting this approach, the devices 200, 500 are capable of signaling to a preferred tag 10a, 10b to instruct it to keep outputting its signature code and force the other tag 10a, 10b into a waiting state where it is temporarily hindered from outputting its signature code. The approach can, of course, also be employed where there are more than two tags present.

A method of interrogation associated with the third approach using the device 200 to interrogate the tags 10a, 10b and select the tag 10a in preference to the tag 10b will now be further elucidated with reference to FIGS. 2 and 7:

STEP 1: The device 200 is instructed from a tag management system (not shown) connected thereto that the tag 10a is specifically to be identified and other tags present are to be forced into the waiting state;

STEP 2: The device 200 commences by generating the signal $S_{RF}$, amplifying the signal $S_{RF}$ to provide the amplified signal $AS_{RF}$ for outputting at its transmitter antenna 240 as the radiation 70. The radiation 70 propagates to the tags 10a, 10b whereat it is received. The radiation 70 is converted to the signal S1 in each of the tags 10a, 10b and rectified to generate the potential difference P therein. The microcontrollers 60 in each of the tags 10a, 10b are energised by the potential difference P and proceed to apply a fluctuating load to their potential difference P in a manner related to the signature codes of the tags 10a, 10b. The fluctuating load causes a correspondingly fluctuating impedance to be presented to the antenna assemblies 20 of the tags 10a, 10b thereby temporally modifying their reflection characteristic and hence giving rise to modulated reflected components 300, 310 of the radiation 70 from the tags 10a, 10b bearing the signature codes. The reflected components 300, 310 propagate back to the receiver antenna 250 of the device 200 whereat they are received;

STEP 3: The radiation components 300, 310 are converted at the receiver antenna 250 to the corresponding signal $S_{TF}$. The amplifier 260 amplifies the signal $S_{TF}$ to generate the corresponding amplified signal $AS_{TF}$. The amplified signal $AS_{TF}$ is heterodyned with the signal $S_{RF}$ to generate the baseband signal $S_{BB}$ which is then passed to the baseband receiver 280;

STEP 4: The receiver 280 filters the signal $S_{BB}$ to isolate spectral components therein and then detects their temporal amplitude fluctuations to identify signature codes present in the signal $S_{BB}$. The receiver 280 selects the identified signature code correlating with that communicated to the device 200 from the aforementioned tag management system. At a response time interval after identifying the correlating signature code, the interval governed by the clocking rate of the correlating signature code as measured by the receiver 280, the receiver 280 issues a pulse command to the oscillator 220 which inserts a pulse into the signal $S_{RF}$;

STEP 5: The signal $S_{RF}$ including the inserted pulse is amplified by the amplifier 230 to generate the signal $AS_{RF}$ which is emitted from the transmitter antenna 240 as the radiation 70;

STEP 6: The tags 10a, 10b monitor the radiation 70 received thereat for the inserted pulse; if the pulse occurs within a time-window after the tags 10a, 10b have output their respective signature code in STEP 2, the tags 10a, 10b will thereby identify whether they are to remain active or temporally switch to the waiting state; in this example, the pulse occurs in the expected time-window of the tag 10a and not in that of the tag 10b thereby forcing tag 10b into the waiting state and the tag 10a to remain active. As the tag 10b switches to the waiting state, contention between the tags 10a, 10b is thereby avoided;

STEP 7: The device 200 repetitively outputs synchronisation pulses in the radiation 70 as described above in STEPS 4 and 5 until the device 200 is instructed from the tag management system to search for an alternative tag. Thus, the tag 10b returns from the waiting state to an active state where it can be selected after a recovery time period, the time period being, for example, in a range of microseconds to one second.

The inventors have appreciated that the tag 10 can be modified to provide it with an extended operating range when powered from radiation received thereat. FIG. 10 provides a circuit of such a modified tag indicated generally by 600. Compared to the tag 10, the tag 600 additionally includes a piezoelectric transformer indicated by 610 and an output diode detection unit indicated by 650 shown included within a dashed frame 660. In the tag 600, the transformer 610 comprises a primary region 620 and a secondary region 630 integrated to form a unitary elongate mechanical component. The regions are fabricated from a piezoelectric composition such as lead zirconate titanate (PZT) or similar piezoelectric material. The component has the primary region 620 at a first end thereof and the secondary region 630 at a second end thereof. The component, in operation, is capable of being excited into an elongate mode of resonance. On account of the primary region 620 comprising a stack of electrically parallel-connected piezo-electric plates and the secondary region 630 comprising a single slab of piezo-electric material, the transformer 610 is capable of increasing the voltage amplitude of a signal output from the diode detection unit 16 applied to the primary region 620 to generate an enhanced potential difference P at the output of the diode detection unit 650 for powering the logic unit 20 and the voltage controlled oscillator 18.

Preferably, the transformer 610 is designed to resonate in its elongate mode in a frequency range of 10 kHz to 300 kHz, the resonance having associated therewith a Q-factor in the order of 20 to 500. For example, the transformer 610 can be manufactured so that:

(a) the primary region 620 comprises a stack of 5 to 20 layers of polarised piezo-electric material, each layer having a thickness in a range of 50 :m to 0.2 mm and major surfaces each being of an area in a range of 1 mm×1 mm to 5 mm×5 mm; the stack can be formed by adhesively bonding or soldering the layers together at these major surfaces; moreover, the major surfaces can be metallized for making electrical connection thereto; and (b) the secondary region 630 can comprise a slab of polarised piezoelectric material having major front and rear major surfaces each having an area in a range of 1 mm×1 mm to 5 mm×5 mm and a thickness in a range of 0.3 mm to 1 mm.

The primary and secondary regions 620, 630 can be adhesively bonded or soldered together to form a unitary structure.

The detection unit 650 includes a Schottky diode pair indicated by 670 and an associated bypass capacitor 680 connected together in a similar manner to the detection unit 16 as shown in FIG. 10. Primary and secondary terminals $T_1$, $T_2$ of the primary region 620 are connected to first and second electrodes of the bypass capacitor 28 respectively. A secondary region 630 terminal $T_S$ is connected to a mid-point of the diode pair 670 as shown in FIG. 10.

Operation of the tag 600 in combination with the interrogating device 200 shown in FIG. 7 will now be described.

The generator 220 of the device 200 generates a radio frequency signal at a frequency $f_1$ appropriate for the tag 600 and amplitude modulates the radio signal at a frequency $f_2$ corresponding to the elongate resonant mode of the transformer 610 at which the transformer 610 is capable of providing a potential increase from its primary region 620 to its secondary region 630 as elucidated in the foregoing. The power amplifier 230 amplifies the amplitude modulated signal and the resulting amplified signal is output from the antenna assembly 240 wherefrom it is radiated as the radiation 22. The radiation 22 is received at the antenna assembly 12 of the tag 600 whereat it causes a corresponding received signal $S_R$ to be generated across the first and second terminals of the assembly 12. The received signal $S_R$ passes to the diode detection unit 16 which rectifies the signal $S_R$ to produce a corresponding unipolar signal $S_T$ which comprises signal components predominantly at the frequency $f_2$. The signal $S_T$ excites the transformer 610 into resonance along its elongate axis to generate a signal $S_S$ at the secondary region of the transformer 650 at the frequency $f_2$, the signal $S_S$ having a greater voltage amplitude compared to the signal $S_T$. The signal $S_S$ passes to the diode detection unit 650 which rectifies it to provide the potential difference P for powering the logic unit 20 and the oscillator 18 as described in the foregoing, the oscillator 18 providing the clock signal CLK at a frequency which increases as P increases.

The transformer 610 is particularly appropriate for use in the tag 600; wire-wound ferrite-cored or air-cored transformers are more bulky and do not easily provide an appropriate range of terminal impedances compared to the transformer 610. Moreover, switched capacitor-type voltage transformers are also not appropriate because they require an appreciable voltage to function.

The inventor has appreciated that the piezo-electric transformer 610 can have a relatively high mechanical Q-factor at resonance, for example often exceeding several hundred in value, especially if a hard PZT ceramic material exhibiting a dielectric loss of 0.005 or less at a test frequency of 1 kHz is utilized. Such a hard PZT material is, for example, available from a Danish company Ferroperm A/S, Hejreskovvej 18A, DK-3490 Kvistgaard, Denmark under product reference PZT26. The dielectric loss of a piezo-electric material is defined as the tangent of the electrical loss angle observed when electrically driving the material. The dielectric loss also represents the ratio of resistance to reactance of a parallel equivalent circuit of a piezo-electric transformer made from the material. The dielectric loss can be measured directly using an impedance bridge, for example at an excitation frequency of 1 kHz.

As a consequence, the transformer 610 provides a bandwidth limiting filter for load modulation communicated from the microcontroller through the transformer 610 back to the antenna assembly 12. In order to increase the modulation bandwidth of the tag 600, the inventor has devised a modified version of the tag 600 as indicated by 700 in FIG. 11. The tag 700 is identical to the tag 600 except that the input/output (I/O) terminal is connected via a load resistor 710 to the second electrode of the capacitor 24 as shown. Thus, the tag 700 is capable of applying load modulation directly to the antenna assembly 12 and can therefore respond at a greater data rate compared to the tag 600.

The inventor has appreciated that, although inclusion of the transformer 610 and its associated diode detection unit 650 can provide an extended tag operating range, inclusion of the transformer can introduce other problems. However, the resonant frequency of the transformer 610 changes with temperature. In many situations, a tag interrogating device will not have information regarding the temperature of the tags with which it is attempting to communicate. Thus, it is possible for the interrogating device to select an inappropriate frequency $f_2$ which does not exactly coincide with the resonant frequency of the transformer 610 in each of the tags. Such inexact coincidence is especially relevant where the transformer 610 is selected to have an especially high Q-factor to provide the tags 600, 700 with greatly extended range. In order to address such problems, the inventor has devised a solution which involves the interrogating device sweeping the frequency $f_2$ of the radiation 22 in a cyclical manner. In the tags 600, 700, the potential difference P will vary as the frequency $f_2$ in the radiation 22 is swept through resonance of the transformer. Thus, the rate at which the tags 600, 700 output their respective signature codes will change in response to the frequency $f_2$ being swept; in FIG. 8, such sweeping corresponds to the components 420, 430 being swept along the abscissa axis 400. The interrogating device can be programmed to monitor movement of the components 420, 430 as the frequency $f_2$ is swept and thereby determine a frequency $f_2$ appropriate for optimally operating each tag 600, 700. Moreover, by deliberately arranging for tags 600, 700 to have mutually different transformer 610 resonant frequencies, for example by deliberately relaxing their manufacturing tolerances, such a swept frequency approach can be used to assist with resolving contention between tags; as the tags have mutually different frequencies, their respective components would reach a maximum corresponding right-hand-side position along the abscissa axis 400 at mutually different $f_2$ frequencies.

The inventor has also appreciated that tag interrogating devices can be used not only for determining whether or not a particular tag is present but also its angular bearing with respect to the interrogating device. When tags and their associated interrogating devices are operated at relatively low frequencies, for example in a range of 100 kHz to 200 kHz, coupling between the devices and the tags arises predominantly by way of magnetic H-field coupling. Moreover, loop antennae are preferred at such a low frequency range, for example in manner like ferrite coil aerials in long-wave radio receivers which are direction sensitive. Thus, the inventor has devised an interrogating system and associated compatible tag capable of tag direction measurement, the system indicated by 800 and the tag indicated by 810.

The system 800 includes an interrogating device 830 coupled to an antenna assembly indicated by 820. The assembly 820 comprises first and second loop antennae 822a, 822b configured mutually orthogonally as shown. The tag 810 is similar the tag 10 illustrated in FIGS. 1 and 2 except that the antenna assembly 12 is implemented in the form of a loop antenna 840. The system 800 is arranged in a similar configuration to the device 500 in that the switch unit 520 is arranged to selectively switch between the loop antennae 822a, 822b.

The magnitude of the potential difference P developed in the tag 810, for a given angular of the tag 810 relative to the system 800 will be, to a first approximation, proportional to cos N and sin N for the first and second loop antennae 822a, 822b respectively. As elucidated in the foregoing, the potential difference P determines the rate at which the tag 810 outputs its signature code. The rate of signature code output is dependent upon the potential difference P and is included as information in reflected radiation from the tag 810, the information manifest as the frequency of signature code components in the reflected radiation. The reflected radiation received at the interrogating device 830 is processed therein to isolate the components corresponding to the tag 810 for the two antenna 822a, 822b and their relative frequency shift, for example along the abscissa axis 400 in FIG. 8, determined. The relative frequency shift provides an indication of the ratio of sin N to cos N and hence an indication of tan N. By applying an arctan calculation, the angle N can, at least to a first order of magnitude, be determined and hence the bearing of the tag 810 relative to the system 800 established.

It will be appreciated by one skilled in the art of tag design that the tags 10, 50, 60, 80, 100, 600, 700 can be adapted for receiving radiation at other frequencies. For example, the antenna assembly 12 of the tag 10 can be replaced by a piezo-electric ultrasonic transducer so that the tag can be interrogated and powered using ultrasonic radiation, for example ultrasonic radiation in a frequency range of 20 kHz to 500 kHz; inclusion of such ultrasonic transducers enables the tag 10 to be used in marine applications, for example in the off-shore petroleum industry. Alternatively, the antenna assembly 12 of the tags 10, 50, 60, 80, 100, 600, 700 can, for example, be replaced with a photodetector for receiving interrogating optical radiation and generating therefrom tag operating power; tag return radiation can be provided using a pulsed light emitting diode (LED) source or an actuated micromirror. Optical radiation in the context of the present invention is intended to mean electromagnetic radiation having a free-space wavelength in a range of 10 :m to 100 nm.

It will further be appreciated that the voltage controlled oscillator 18 as illustrated in FIGS. 2, 3, 4, 5, 6, 10 and 11 can be implemented in other ways. For example, the oscillator 18 can alternatively employ a fixed frequency oscillator outputting in operation to a digital divider which provides the clock signal CLK at its frequency divided output, the division factor being controlled by the potential difference P by way of one or more voltage comparators and associated logic gates for controlling the divider. For example, the tags 10, 600 can be modified such that their oscillator 18 is implemented as a fixed frequency 13.56 MHz oscillator conforming to an international standard frequency presently being established for tags, for example as employed in the Philips Icode integrated circuit. The fixed frequency oscillator output can be preferably selectively divided in response to changes in the potential difference P as provided in Table 1:

TABLE 1

| Potential difference, P | Selected dividing ratio after the 13.56 MHz fixed frequency oscillator | Frequency of the CLK clocking signal |
| --- | --- | --- |
| 1.8 volts | 256 | 52.96875 kHz |
| 2.0 volts | 128 | 105.9375 kHz |
| 2.2 volts | 64 | 211.875 kHz |
| 2.4 volts | 8 | 1.695 MHz |
| 2.6 volts | 2 | 6.789 MHz |

When the incoming radiation 22 is at a frequency of 13.56 MHz, the signal S1 can be used directly to provide the fixed frequency oscillator output signal for dividing down according to Table 1 to clock the microcontroller in the logic unit 20. Such an approach results in a plurality of the tags 10, 50, 60, 80, 100, 600, 700 thus modified operating synchronously when simultaneously interrogated; this synchronous operation eases signal processing tasks within an interrogating device used and the modified tags.

It will be further appreciated that the tags 10, 50, 60, 80, 100, 600, 700 can be operated so close to the interrogating devices 200, 500 that the voltage controller oscillator 18 and the logic unit 20 can be damaged by excessive potential difference P. In order to circumvent such damage, the inventor has appreciated that one or more voltage limiting components can be included within the tags 10, 50, 60, 80, 100, 600, 700. One convenient manner to include a voltage limiting component in the tag 10 is to connect a Zener diode across the bypass capacitor 28, cathode and anode regions of the Zener diode being connected to the first and second electrodes respectively of the capacitor 28. Similarly, one convenient manner to include a voltage limiting component in the tags 600, 700 is to connect a Zener diode across the capacitor 680, cathode and anode regions of the Zener diode being connected VDD and VSS terminals of the logic unit 20's microcontroller.

The invention claimed is:

1. A variable frequency tag, comprising:
   interfacing circuitry configured to:
      receive interrogating radiation at the tag and generate a corresponding received signal having a magnitude; and
      receive a signature signal and radiate corresponding response radiation;
   processing circuitry configured to receive the received signal and output the signature signal in response, wherein the signature signal includes a signature code that identifies the tag;
   clocking circuitry configured to control a rate at which the signature code is output; and
   power supplying circuitry configured to provide an electrical potential difference for energizing the tag;
   wherein the clocking circuitry is further configured to change a rate at which the signature code is output based on the magnitude of the received signal.

2. The tag of claim 1, wherein the clocking circuitry comprises first and second oscillators, wherein the first oscillator is configured to clock the processing circuitry and the second oscillator is configured to control a frequency at which the signature code is output from the tag in response to the magnitude of the received signal.

3. The tag of claim 2, wherein the first oscillator is further configured to oscillate at a substantially constant frequency.

4. The tag of claim 1, wherein the power supplying circuitry is coupled to the interfacing circuitry, and wherein the power supplying circuitry is configured to derive the potential difference from the received signal.

5. The tag of claim 4, wherein the power supplying circuitry comprises a transformer configured to enhance the potential difference applied to the docking circuitry and the processing circuitry.

6. The tag of claim 5, wherein the transformer is a piezoelectric transformer.

7. The tag of claim 6, wherein the transformer comprises:
   a multilayer primary region configured to be driven by the received signal; and
   a single-layer secondary region at which the potential difference is generated;
   wherein the primary and secondary regions are mechanically coupled.

8. The tag of claim 1, wherein the power supplying circuitry comprises potential difference limiting circuitry configured to prevent excess supply potential damage to the processing circuitry and the clocking circuitry.

9. The tag of claim 1, wherein the interfacing circuitry comprises an antenna assembly configured to generate the response radiation from the received radiation by modulating reflectivity of the antenna assembly depending on tag power consumption.

10. The tag of claim 1, wherein the interfacing circuitry comprises an antenna assembly configured to generate the response radiation from the received radiation by modulating reflectivity of the antenna assembly, and wherein the processing circuitry is coupled in direct communication with the antenna assembly and configured to modulate the reflectivity of the antenna assembly with the signature code.

11. The tag of claim 1, wherein the clocking circuitry is further configured to clock the processing circuitry at a rate which increases as the potential difference increases.

12. The tag of claim 11, wherein the clocking circuitry is further configured to increase the rate at which the processing circuitry is clocked in a stepwise manner in response to increase in the potential difference.

13. The tag of claim 12, wherein the clocking circuitry comprises digital dividing circuitry configured to divide a master clock signal to generate a clocking signal for clocking the processing circuitry, and wherein the master clock signal is derived from the received signal.

14. The tag of claim 12, wherein the clocking circuitry comprises digital dividing circuitry configured to divide a master clock signal generated by oscillating circuitry, and wherein the master clock signal is substantially constant in operation.

15. The tag of claim 11, wherein the clocking circuitry is further configured to increase the rate at which the processing circuitry is clocked in a substantially linear manner in response to increase in the potential difference.

16. The tag of claim 11, wherein the clocking circuitry is further configured to increase the rate at which the processing circuitry is clocking in a substantially logarithmic manner in response to increase in the potential difference.

17. The tag of claim 11, wherein the clocking circuitry comprises an oscillator including a plurality of serially-connected logic gates configured with feedback therearound for generating a clocking signal for clocking the processing circuitry, and wherein the logic gates have a signal propagation therethrough that is a function of the potential difference.

18. The tag of claim 17, wherein the oscillator comprises ring-of-three logic gates configured with feedback therearound for generating the clocking signal.

19. The tag of claim 1, wherein the processing circuitry is further configured to dissipate a majority of power required to operate the tag.

20. The tag of claim 1, wherein the processing circuitry is further configured to output the signature code repetitively with pause intervals therebetween during which the code is not output.

21. The tag of claim 20, wherein one of the pause intervals corresponds to at least 90% of an interval at which the signature code is output.

22. The tag of claim 1, wherein the processing circuitry is configured to be receptive to at least one synchronization pulse in the received signal and is switchable to a temporary wait state in which the processing circuitry does not output the signature code when the at least one synchronization pulses does not align to a synchronization time window after the tag outputs the signature code.

23. The tag of claim 1, wherein the processing circuitry comprises CMOS logic circuits configured to generate the signature code, and wherein the CMOS logic circuits are configured to consume increasing power in operation as their clocking rate is increased.

24. An interrogating device for interrogating at least one variable frequency tag according to claim 1, the device comprising:
   signal generating circuitry configured to generate an interrogating signal;
   interrogation interfacing circuitry configured to:
      radiate the interrogating signal as interrogating radiation toward the at least one tag; and
      receive response radiation from the at least one tag and generate a corresponding response signal; and signal processing circuitry configured to filter the response signal and thereby isolate at least one signal spectral component from the at least one tag and extract a signature code from the at least one signal component to identify the at least one tag.

25. The device of claim 24, wherein the interrogation interfacing circuitry comprises a directional antenna assembly configured to interrogate the at least one tag from a plurality of relative angles, and wherein the signal processing circuitry is further configured to process response signals arising at the device for the plurality of relative angles to determine bearing of the at least one tag with respect to the device.

26. An interrogating device for interrogating at least one variable frequency tag according to claim 1, the device comprising:
    signal generating circuitry configured to generate an interrogating signal including an excitation component configured to excite at least one transformer of the at least one tag into resonance;
    interrogation interfacing circuitry configured to:
        radiate the interrogating signal as interrogating radiation toward the at least one tag and excite the at least one transformer into resonance to generate an enhanced potential signal within the at least one tag; and
        receive response radiation from the at least one tag and generate a corresponding response signal; and
    signal processing circuitry configured to filter the response signal and thereby isolate at least one signal spectral component from the at least one tag and extract a signature code from the at least one signal component to identify the at least one tag.

27. The device of claim 26, further comprising circuitry configured to frequency sweep the excitation component in frequency for at leas one of:
    operating the at least one tag at resonance of at least one transformer; and
    resolving contention between simultaneously-responding tags.

28. The device of claim 26, further comprising tag transporting circuitry configured to transport in operation the at least one tag spatially in relation to the interrogation interfacing circuitry, wherein the signal processing circuitry is further configured to sample the response signal repetitively at intervals for resolving multiple-tag contention.

29. The device of claim 26, wherein the interrogation interfacing circuitry comprises a plurality of antennas spatially arranged in relation to the at least one tag and configured to radiate the interrogating radiation, and wherein the signal processing circuitry is further configured to:
    switch in sequence through the antennas to interrogate the at least one tag from varying distances; and
    process corresponding response signals at the device for resolving multiple tag contention.

30. A tagging system comprising at least one variable frequency tag according to claim 1 and a device configured to interrogate and identify the at least one tag.

31. A method of interrogating a variable frequency tag according to claim 1 using an interrogating device, the method comprising:
    emitting interrogating radiation from the device toward the tag;
    receiving the interrogating radiation at the tag and generating a corresponding received signal;
    receiving the received signal at processing circuitry of the tag;
    outputting a signature signal from the processing circuitry in response to receiving the received signal, wherein the signature signal includes a signature code that identifies the tag, and wherein the signature code is output at a rate dependent upon a supply potential difference energizing the tag;
    radiating the signature signal as response radiation from the tag;
    receiving the response radiation from the tag at the device and generating a corresponding interrogation received signal; and
    filtering the interrogation received signal in the device to isolate at least one spectral component corresponding to the tag, extracting the signature code of the tag from the at least one spectral component, and correlating the signature code with at least one signature template to identify the tag.

32. The method of claim 31, further comprising deriving the supply potential difference from the received signal.

33. The method of claim 32, further comprising enhancing the supply potential difference by using a piezo-electric step-up transformer.

34. The method of claim 33, wherein the interrogating radiation comprises a component for exciting the transformer into vibration, the method further comprising sweeping the component in frequency for determining when the tag is operating at resonance of its transformer.

35. A method of resolving contention between a plurality of variable frequency tags according to claim 1, wherein the tags are interrogated from an interrogating device, the method comprising:
    emitting interrogating radiation from the device toward the tags;
    receiving the interrogating radiation at each tag and generating a corresponding received signal;
    receiving, at each tag, the received signal at processing circuitry of the respective tag;
    outputting a signature signal from the processing circuitry of each tag in response to receiving the received signal, wherein the signature signal includes an associated signature code that identifies the respective tag, wherein the signature code is output at a rate dependent upon a supply potential difference energizing the respective tag, and wherein the potential difference is derived from the received signal of the respective tag;
    radiating the signature signal of each tag as response radiation from the respective tag;
    receiving the response radiation from the tags at the device and generating a corresponding interrogation received signal;
    filtering the interrogation received signal at the device to isolate at least one spectral component corresponding to the tags, extracting the signature codes of the tags from the at least one spectral component, and correlating the signature codes with at least one signature template for identifying the tags; and
    if contention exists with respect to at least one of the spectral components, repetitively modifying a spatial relationship between the device and the tags and repeating the previous steps until the contention is resolved.

36. A method of resolving contention between a plurality of variable frequency tags according to claim 1, wherein the tags are interrogated from an interrogating device, the method comprising:
    emitting interrogating radiation from the device toward the tags;
    receiving, at each tag, the interrogating radiation and generating a corresponding received signal thereat;

receiving, at each tag, the received signal at processing circuitry of the respective tag;

outputting a signature signal from the processing circuitry of each tag in response to receiving the received signal, wherein the signature signal includes an associated signature code that identifies the respective tag, wherein the signature code is output at a rate dependent upon a supply potential difference energizing the respective tag, wherein the potential difference is derived from the received signal of the respective tag, and wherein the signature code is output repetitively with pauses therebetween during which the code is not output;

radiating the signature signal of each tag as response radiation from the respective tag;

receiving the response radiation from the tags at the device and generating a corresponding interrogation received signal;

filtering the interrogation received signal at the device to isolate at least one spectral component corresponding to the tags, extracting the signature codes of the tags from the at least one spectral component, and correlating the signature codes with at least one signature template for identifying the tags; and if contention exists with respect to at least one of the spectral components, repeating the previous steps until the contention is resolved.

37. A method of resolving contention between a plurality of variable frequency tags according to claim 1, wherein the tags are interrogated from an interrogating device, the method comprising:

emitting interrogating radiation from the device toward the tags;

receiving the interrogating radiation at each tag and generating a corresponding received signal;

receiving at each tag the received signal at processing circuitry of the respective tag;

identifying at least one pulse present in the received signal at each tag, and outputting an associated signature signal from the processing circuitry of the respective tag in response to receiving the received signal depending on whether or not the at least one pulse is coincident with a time window associated with the respective tag, wherein the signature signal includes an associated signature code for use in identifying the respective tag, wherein each signature code is output at a rate dependent upon a supply potential difference energizing the respective tag, and wherein the potential difference is derived from the received signal of the respective tag;

radiating the signature signals as response radiation from at least one tag;

receiving the response radiation from the at least one tag at the device and generating a corresponding interrogation received signal;

filtering the interrogation received signal at the device to isolate at least one spectral component corresponding to the at least one tag, extracting the signature code of the at least one tag from the at least one spectral component, and correlating the signature code with at least one signature template for identifying the at least one tag; and if contention exists with respect to at least one of the spectral components, outputting the at least one pulse in the interrogating radiation to temporarily disable at least one of the tags from responding and repeating the previous steps until the contention is resolved.

38. The method of claim 37, wherein a time window of each tag is temporally dependent upon a clocking rate at which the processing circuitry of the at least one tag is clocked, and wherein the clocking rate in turn is dependent on the supply potential difference of the respective tag.

* * * * *

UNITED STATES PATENT AND TRADEMARK OFFICE
CERTIFICATE OF CORRECTION

| | | |
|---|---|---|
| PATENT NO. | : 8,138,892 B2 | Page 1 of 1 |
| APPLICATION NO. | : 10/520174 | |
| DATED | : March 20, 2012 | |
| INVENTOR(S) | : Forster | |

It is certified that error appears in the above-identified patent and that said Letters Patent is hereby corrected as shown below:

In Column 8, Line 40, delete "power," and insert -- power; --, therefor.

In Column 10, Line 29, delete "preprogrammed" and insert -- pre-programmed --, therefor.

In Column 15, Line 10, delete "a, b,c." and insert -- a, b, c. --, therefor.

In Column 17, Line 14, delete "piezoelectric" and insert -- piezo-electric --, therefor.

In Column 17, Line 19, delete "piezoelectric" and insert -- piezo-electric --, therefor.

In Column 17, Line 20, delete "piezoelectric" and insert -- piezo-electric --, therefor.

In Column 17, Line 48, delete "piezoelectric" and insert -- piezo-electric --, therefor.

In Column 21, Line 41, in Claim 5, delete "docking" and insert -- clocking --, therefor.

In Column 23, Line 34, in Claim 27, delete "leas" and insert -- least --, therefor.

In Column 25, Line 35, in Claim 37, delete "receiving at each tag" and insert
-- receiving, at each tag, --, therefor.

Signed and Sealed this
Twenty-fifth Day of September, 2012

David J. Kappos
*Director of the United States Patent and Trademark Office*